(12) United States Patent
Schmidt

(10) Patent No.: US 7,942,464 B2
(45) Date of Patent: May 17, 2011

(54) TONNEAU STYLE POP-UP CAMPER FOR PICKUP TRUCKS

(75) Inventor: Kenneth Henry Schmidt, Sidney, OH (US)

(73) Assignee: Kenneth H. Schmidt, Sidney, OH (US)

( * ) Notice: Subject to any disclaimer, the term of this patent is extended or adjusted under 35 U.S.C. 154(b) by 286 days.

(21) Appl. No.: 12/229,086

(22) Filed: Aug. 20, 2008

(65) Prior Publication Data

US 2009/0079229 A1    Mar. 26, 2009

Related U.S. Application Data

(60) Provisional application No. 60/995,136, filed on Sep. 25, 2007.

(51) Int. Cl.
*B60P 3/345* (2006.01)

(52) U.S. Cl. ........................................ 296/165

(58) Field of Classification Search ................ 296/156, 296/161, 163, 164, 165, 173
See application file for complete search history.

(56) References Cited

U.S. PATENT DOCUMENTS

| | | |
|---|---|---|
| 3,583,755 A | 6/1971 | Hedrick, Jr. |
| 3,675,885 A | 7/1972 | Shute |
| 3,853,369 A | 12/1974 | Holden |
| 4,109,954 A | 8/1978 | Wall |
| 4,201,413 A | 5/1980 | Rowe |
| 4,294,484 A | 10/1981 | Robertson |
| 4,613,181 A | 9/1986 | Rafi-Zadeh |
| 4,673,209 A | 6/1987 | Rafi-Zadeh |
| 5,002,329 A | 3/1991 | Rafi-Zadeh |
| 5,161,851 A | 11/1992 | Rafi-Zadeh |
| 6,227,592 B1 | 5/2001 | Thacker |
| 6,712,422 B1 | 3/2004 | Vaillancourt |
| 6,749,252 B2 | 6/2004 | Cervenka |
| 6,932,418 B1 | 8/2005 | Connell |
| 7,404,590 B2 | 7/2008 | Loranger |

OTHER PUBLICATIONS

Starcraft RV Inc. www.starcraftrv.com/pine_mountain/index.html 903 S. Main St., PO Box Middlebury, IN 46540 Aug. 23, 2010.
Outfitter Manufacturing-Inc www.outfittermfg.com 4402 N. Valley Dr., Longmont CO 80504 Aug. 23, 2010.
Four Wheel Pop_Up Campers www.fourwheelcampers.com 1460 Churchill Downs Ave., Woodland, CA 95776 Jan. 16, 2006.
Coyote RV / Phoenix Popup Campers www.phoenixcampers.com 8095 Oneida #4, Commerce City, CO 80022 Sep. 12, 2007.
Hallmark'S Pop-Up Truck Campers www.hallmarlrv.com 12524 Weld County Road 25 1/2, Fort Lupton, CO 80621 Aug. 23, 2010.
Lance Camper Truck Camper www.lancecamper.com 43120 Venture St., Lancaster, CA 93535 Sep. 16, 2010.
Northstar Campers www.northstarcampers.com R. C. Willett Co., Inc. 3040 Leversee Rd, Cedar Falls, IA 50613 Aug. 23, 2010.

(Continued)

*Primary Examiner* — Hilary Gutman

(57) ABSTRACT

The Tonneau Pop-up Camper is a fully functional pickup truck pop-up camper. When traveling, the camper fits under a tonneau style cover and does not affect the truck's safety, visibility, aerodynamics or economics. When camping, the tonneau camper is equal or superior to a "Low Profile, Bed over Cab, Pop-Up, Truck Camper." Changeovers between camping and travel configurations, by one person, are completed in less than a couple of minutes. The sleeping quarters are located on top of the truck bed. The living quarters are at ground level in an attached tent, supported by one frame extension from the camper's base module. Attached steps provide easy access between the sleeping and living quarters. Cabinets, counters and storage bins located under the sleeping area are easily accessed from the living area. Utilities are integrated into one utility module under the front of the camper, and two controllers located at the back of the base module.

11 Claims, 17 Drawing Sheets

OTHER PUBLICATIONS

Travel Lite www.travellitecampers.com 71913 County Road 23, New Paris, IN 46553 Aug. 23, 2010.

Alaskan Camper www.alaskancamper.com 420 NE Alaskan Way, Chehalis, WA 98532 Sep. 16, 2010.

Sportz Truck Tents www.sportzbynapier.com 1711 Cudaback Avenue, Suite1220, Niagara Falls, NY 14303 Sep. 16, 2010.

Starcraft Rv, Inc—Pine Mountain Truck Campers www.starcraftv.com/pine_mountain/index.html.

Outfitter Manufacturing Inc—Slide-In Pop-Up Truck Campers www.outfittermfg.com/home.htm.

Four Wheel Pop_Up Campers www.fourwheelcampers.com.

Phoenix Pop_Up Campers www.phoenixcampers.com.

Hallmark MFG. Inc www.hallmarkrv.com/page/home.html.

American Campers and Trailers www.americancampersandtrailers.com.

R.C.Willett Co. www.northstarcampers.com.

Travel Lite www.travellitecampers.com.

TNT Innovations www.tntinnovtions.ca.

Truck Addons www.truckaddons.com/Catalog/subpages/topup_campertonneau.htm.

TONNEAU STYLE POP-UP CAMPER FOR PICKUP TRUCKS

CROSS-REFERENCE TO RELATED APPLICATIONS

This application claims the benefit of provisional patent application Ser. No. 60/995,136 filed Sep. 25, 2007 by the present inventor.

FEDERALLY SPONSORED RESEARCH

Not Applicable

SEQUENCED LISTING, A TABLE, OR A COMPUTER PROGRAM LISTING

Not Applicable

BACKGROUND OF THE INVENTION

1. Field of Invention

This invention relates to pop-up truck campers, specifically to the design and implementation of a truck pop-up camper that in the travel configuration will fit under a typical pickup truck tonneau style cover, and in a camping configuration has all the functionality of a typical truck pop-up camper.

2. Prior Art

Commercially Available Prior Art

Any discussion of prior art throughout the specification should in no way be considered as an admission that such prior art is widely known or forms part of common general knowledge in the field.

Companies such as Starcraft RV Inc., Outfitter Manufacturing Inc., Four Wheel Campers, Coyote RV, Hallmark Mfg Inc., Lance Campers, R. C. Willett Co. Inc., Travel Lite and Alaskan Camper, illustrate typical "Low Profile, Bed over Cab, Pop-Up Truck Campers." All of these truck campers have the following concerns:

A. Safety Problems
  (i) When the truck is being driven, vision through the center rear view mirror is completely blocked. Many pop-up campers require extensions for the side rear view mirrors.
  (ii) The weight of the camper raises the center of gravity reducing the stability of the truck. Some of the larger campers require installation of heavy-duty stabilizers, springs and shock absorbers.
  (iii) Utility items such as propane tanks, water tanks, batteries, etc. are usually stuffed in whatever nook or cranny is available; sometimes these items are located above the sides of the pickup bed reducing driving stability.
  (iv) The living, kitchen and storage areas of the typical pop-up camper are limited by the size of the truck bed. Some pop-up campers attempt to increase the size of the living area by having a "hang-over" past the rear bumpers which contributes to problems with weight, stability, aerodynamics, resulting in higher operating costs and reduced driving safety margins.
  (v) The sleeping area of a typical pop-up camper is a cantilevered platform above the truck's cab, resulting in a reasonable size bed for two adults; however, safety is a concern since the sleeper has to get in and out of a bed mounted four or more feet above the floor and due to the limited floor space, a decent ladder or steps are normally not provided. Also the weight of a cantilever design and the position above the truck's cab reduces stability, and the added resistance of airflow around the sleeping quarters above the truck's cab impacts gas mileage and economics of the truck.
  (vi) Entering or exiting the camper requires a large step up or down between the ground and floor of the camper. If some type of steps is used, the steps are located outside, and slipping or falling is probable, especially if it is raining or muddy.

B. Economy Problems
  (i) The large cross section of the cab-over camper increases the wind resistance resulting in lower gas mileage.
  (ii) Because of the weight of the camper, many pop-up campers require larger pickup trucks or heavy-duty shocks, springs, and sway bars resulting in more cost and lower gas mileage.

C. Comfort and Convenience Problems
  (i) The sleeping quarters are located over the truck's cab, making access difficult for many people.
  (ii) The living and kitchen quarters are limited in space; more than two adults are too many.

D. Tents on a Pickup Truck Bed

Sportz Truck Tents, supplies tents under a tonneau type cover and tents on a pickup bed. These collapsible shelters offer shelter, but they are severely limited in space and functionality compared to a typical pop-up truck camper.

PRIOR ART PATENTS

U.S. Pat. Nos. 6,749,252, 6,712,422, 6,932,418 4,294,484, 7,404,590, 3,583,755, and 4,109,954 describe tents under a tonneau type cover. Problems with these collapsible shelters include:
  A. These campers may provide shelter from the weather, but they are severely limited in space and functionality compared to a typical pop-up truck camper.
  B. None of the tents are at the ground level; entry or exiting between ground and truck's bed is typically a large step-up or step-down.

U.S. Pat. No. 3,853,369 defines a folding tailgate step; however it is very complicated, no handrails, exposed to the weather, slippery when muddy or wet, and not very aesthetically pleasing U.S. Pat. No. 4,201,413 provides an example of a typical lift apparatus for the roof shell of a pop-up camper. However, problems with this type of pop-up roof include:
  A. The roof shell cannot be raised or lowered by a single person standing on the ground unless complicated and expensive hydraulics, motors, etc. are used.
  B. The roof shell extends over the roof of the pickup truck. The person raising the roof shell typically starts by standing on the rear bumper; or, he or she opens the camper's rear door and crawls inside of the camper to raise the roof.

U.S. Pat. No. 3,675,885, is a prior art patent of a side mounted "Spring Loaded Folding Arm" hinge that can be operated from the ground. The later U.S. Pat. Nos. 4,613,181, 4,673,209, 5,002,329 and 5,161,851 are mostly attempts to fix the problems of the first patent; however they all still share the following problems:
  A. The design is not acceptable for a pop-up with canvas sides since the folding arm hinge closes with a scissoring action, which would cause wear or cutting of the sides of the canvas sides.
  B. In applications with no canvas sides, the operator is exposed to the dangerous scissoring action of the folding arm hinge and unless the person raising the roof shell is very careful, fingers could be mashed or cut off.

C. Taut canvas sides cannot be attached to the roof and base in the same plane as the pivot pins of the spring loaded folding arms. If a taut canvas side is attached between the roof and base of the camper on the outside of the folding arm hinges, the canvas will be stretched or torn when one side of the roof shell is up and the other side is still down. If a canvas side is mounted on the inside of the folding arm hinges, the canvas would have to fit around the lever of the folding arm hinge creating an excess of six to twelve inches of canvas resulting in extremely baggy sides; also, the operator will be exposed to the dangerous scissoring action of the hinges.

D. Fold-back can occur to the first spring loaded folding arm raised, when the spring loaded folding arm on the opposite side is being raised. Attempts to solve this problem in some of the patents include manual locking pins, flexible stringers, and multiple braces, all of which are band-aids, not solutions to the problem.

E. Closing or lowering the roof shell, by one person, is a problem since there are four folding arm hinges, one located at each corner. These locations are too far apart for one person to collapse both hinges on one side at the same time. This is a problem since when the first hinge has been started to close, it will return to the open position before the person can move to the other spring loaded folding arm, and start it closing.

F. U.S. Pat. No. 6,227,592 is a tonneau type cover that rises up and back, and may be a good solution to raise a tonneau top, but would not be adaptable for a pop-up style camper that requires a straight up and down motion for flexible sides.

BRIEF SUMMARY OF THE INVENTION

More specifically this document details a pop-up truck camper, that when in the travel configuration, will fit under a tonneau style or type cover with minimal effect on the rear vision, stability, and economics of a typical pickup truck. In addition, when in the camping configuration, the tonneau style pop-up camper has sleeping quarters, living quarters, kitchen cabinets, more room, and equal or more functionality than a typical low profile, bed over cab, pop-up, truck camper. The tonneau style pop-up camper can be configured between travel and camping configurations by one person, standing on the ground, in less than three minutes, enabling the camper to be used to prepare quick meals or just to stop and relax at any time, in any weather, any place.

DETAILED DESCRIPTION OF THE INVENTION

Figure 1:
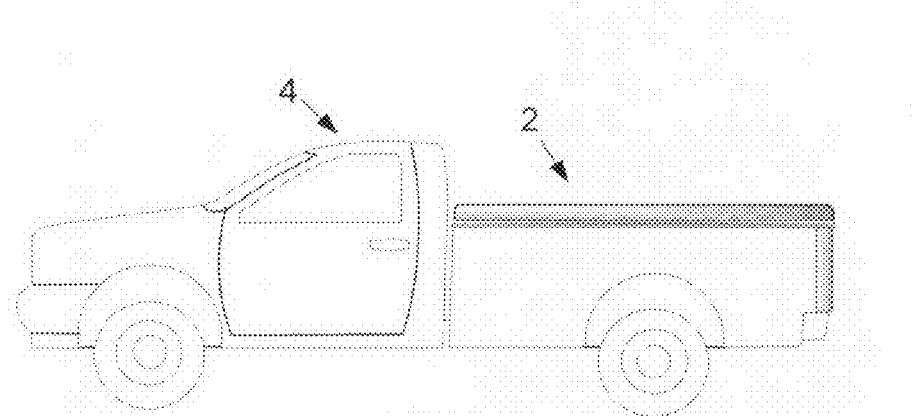
FIG. 1 is an orthogonal driver's side view of the tonneau style pop-up camper mounted on a pickup truck, in the travel configuration.

| Element Description | Reference Numbers | Figure Numbers |
|---|---|---|
| tonneau style pop-up camper | 2 | 1, 2, 3, 4, 29 |
| pickup truck | 4 | 1, 2 |
| top module | 6 | 3, 4, 5, 6, 7, 21, 22, 24, 31, 32, 33 |
| roof shell | 6A | 4, 5, 6, 7, 21, 22, 24, 29 |
| spring loaded hinged frame | 6B | 5, 6, 7, 8, 9, 21, 22, 29 |
| base frame | 6C | 4, 5, 6, 7, 21, 22 |
| weather seal | 6D | 5, 6, 7 |
| sleeping quarters enclosure | 6E | 4, 5, 6, 7, 17, 21, 22, 31, 32, 33 |
| roof shell handle | 6F | 4, 5, 6, 7 |
| base module | 8 | 3, 4, 21, 22, 28, 31, 32, 33 |
| base chassis | 8A | 4, 21, 22, 23, 23A, 29 |
| utility access panel | 8B | 29 |
| camper base tailgate | 8C | 2, 4, 21, 22, 28, 29, 31, 32, 33 |
| utility module | 10 | 3, 4, 29, 31, 32, 33, 34 |
| sleeping quarters | 12 | 2, 4, 5, 6, 7, 18, 19, 20, 21, 22, 31, 32, 33 |
| sleeping platform | 12B | 29, 31, 32, 33 |
| living quarters | 14 | 2, 4, 18, 19, 20, 21, 22, 31, 32, 33 |
| floor plan, option A | 14A | 18 |
| floor plan, option B | 14B | 19 |
| floor plan, option C | 14C | 20 |

-continued

| Element Description | Reference Numbers | Figure Numbers |
|---|---|---|
| transition area | 14E | 18, 19, 20 |
| shower | 14F | 19, 20 |
| portable toilet | 14G | 19, 20 |
| sleeping bag or folding cot | 14H | 19, 20 |
| spring loaded hinge | 16 | 8, 9, 10, 11, 16, 16A, 16B, 16C |
| levered hinge arm | 16B | 11, 12, 13, 16A, 16B, 16C |
| spring anchor bolt | 16C | 11 |
| spring | 16D | 5, 6, 7, 11 |
| cable clamp | 16E | 11 |
| cable | 16F | 7, 11 |
| pulley | 16G | 7, 13 |
| axle | 16H | 13 |
| arm | 16J | 13 |
| stabilizer hinge | 18 | 8, 9, 14, 15 |
| stabilizer hinge arm | 18A | 14, 15 |
| torsion bar | 20 | 8, 9 |
| upper canvas lath | 22 | 5, 6, 7, 8, 9 |
| lower canvas lath | 24 | 5, 6, 7, 8, 9 |
| hinge | 26 | 5, 6, 7, 8, 11, 12, 14, 15, 16A, 16B, 16C |
| safety latch assembly | 28 | 16, 16A, 16B, 16C |
| spring latch | 28A | 8, 11, 16A, 16B, 16C |
| latch catch pin | 28B | 11, 16A, 16B, 16C |
| latch release | 28C | 9, 11, 16A, 16B, 16C |
| attaching hardware | 28D | 11, 16A, 16B, 16C |
| driver's side | 30A | 17 |
| center | 30B | 17 |
| passenger's side | 30C | 17 |
| interface (sleeping quarters) | 30D | 17, 21, 22 |
| stretchable band | 30E | 5, 6, 7, 17 |
| hook | 30F | 17 |
| ring | 30G | 17 |
| lath pocket | 30H | 17 |
| cross web bracing | 30J | 17 |
| windows | 30K | 17 |
| pocket (stretchable band) | 30L | 17 |
| living quarters enclosure | 32 | 4, 21, 22, 25, 29, 31, 32, 33 |
| front | 32B | 21, 22, 25 |
| floor | 32C | 21, 22, 28 |
| tailgate canvas | 32D | 21, 22, 28, 29 |
| interface (living quarters) | 32E | 21, 22 |
| roof | 32F | 21, 22, 24, 25, 29 |
| roof and front seam | 32G | 25 |
| roof shell anchor | 32H | 24 |
| roof lath pocket | 32J | 24 |
| roof lath | 32K | 24 |
| weight | 32L | 21, 22 |
| frame extension | 34 | 21, 22, 23, 23A, 25, 27 |
| frame extension pole | 34A | 23, 23A, 25, 26, 27 |
| frame cross member | 34B | 23, 23A, 25, 27, 31, 32, 33 |
| frame bracket interface | 35 | 21, 22, 23, 23A, 26, 27 |
| guide bracket | 35A | 23, 23A, 26, 27 |
| storage tube | 35B | 21, 22, 23, 23A, 26, 27 |
| stop block | 35C | 23, 23A, 26, 27 |
| attached folding stairs | 36 | 28, 29 |
| step | 36A | 28, 31, 32, 33 |
| sliding horizontal support | 36C | 28, 29 |
| vertical support strap | 36D | 28 |
| stringer | 36E | 28, 29 |
| stringer pivot | 36F | 28, 29 |
| cabinet set | 38 | 30 |
| right cabinet module | 38A | 30 |
| center cabinet module | 38B | 29, 30, 31, 32, 33 |
| left cabinet module | 38C | 30 |
| counter | 38D | 30, 31, 32, 33 |
| cabinet | 38E | 30 |
| storage bin | 38F | 29, 30, 31, 32, 33 |
| cabinet door | 38G | 30, 31, 32, 33 |
| utility chassis | 40A | 34 |
| electrical controller | 40B | 34 |
| inverter | 40C | 34 |
| battery charger | 40D | 34 |
| solenoid switch | 40E | 34 |
| water pump | 40F | 34 |
| deep discharge battery | 40G | 34 |
| gray water tank | 40H | 34 |
| propane tank | 40J | 34 |

-continued

| Element Description | Reference Numbers | Figure Numbers |
|---|---|---|
| fresh water tank | 40K | 34 |
| electric control module | 42 | 23, 35 |
| electrical control panel | 42A | 35 |
| electric interface box | 42B | 35 |
| campground voltage cable | 42C | 35 |
| truck voltage cable | 42D | 35 |
| interface cable | 42E | 35 |
| water control module | 44 | 23A, 36 |
| water control panel | 44A | 36 |
| water interface box | 44B | 36 |
| fresh water in hose | 44C | 36 |
| fresh water control valve | 44D | 36 |
| fresh water tank hose | 44E | 36 |
| fresh water vent hose | 44F | 36 |
| fresh water vent valve | 44G | 36 |
| fresh water vent tank hose | 44H | 36 |
| gray water out hose | 44J | 36 |
| gray water control valve | 44K | 36 |
| gray water tank hose | 44L | 36 |
| gray water vent hose | 44M | 36 |
| gray water vent valve | 44N | 36 |
| gray water vent tank hose | 44P | 36 |
| folding camp chairs | 46A | 29 |
| ice chest | 46B | 29 |
| roof shell rack mounts | 48 | 29 |

FIGS. 1,2,3,4—Camper Overview

The invention is a fully functional tonneau style pop-up camper 2 that when in the travel configuration (FIG. 1), will fit under a tonneau style cover with minimal effect on the pickup truck's 4 rear vision, stability, or economics; and, when in the camping configuration (FIG. 2) has a sleeping quarters 12, a living quarters 14, more room, and more functionality then most typical low profile, bed over cab, pop-up, truck campers. The tonneau style pop-up camper 2 can be reconfigured between travel (FIG. 1) and camping (FIG. 2) configurations by one person standing on the ground, in less than three minutes.

FIGS. 1,2,3,4—Camper, Preferred Embodiment

FIG. 1 is an orthogonal view showing the driver's side of a tonneau style pop-up camper 2 in the travel configuration on a typical pickup truck 4. The pickup truck 4 has a full sized bed, and the truck's tailgate is removed. The camper 2 will also fit a full size short bed pickup truck with the truck's tailgate open and horizontal. In the travel configuration, the top of the camper 2 extends a small distance, above the top of the truck's bed and is approximately even with the truck's bumper at the rear of the bed.

Figure 2:
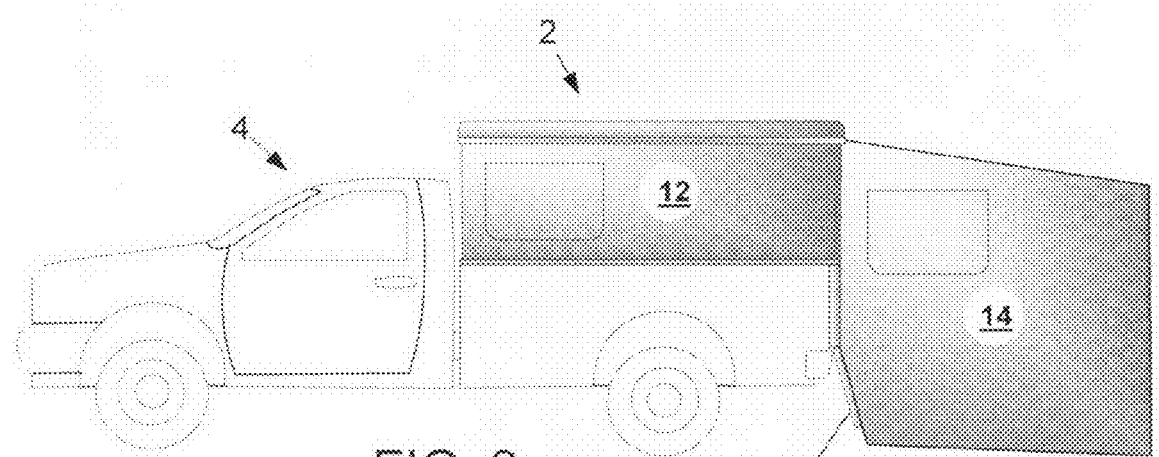
FIG. 2 is an orthogonal driver's side view of the tonneau style pop-up camper mounted on a pickup truck, in the camping configuration.

FIG. 2 is an orthogonal view showing the driver's side of the tonneau style pop-up camper 2 in the camping configuration, on a typical pickup truck 4 with a full size bed, and the camper base tailgate 8C is open. The sleeping quarters 12 are located in the top portion of the truck's bed and the living quarters 14 are located at the ground level in an attached tent-like structure at the back of the truck.

Figure 3:
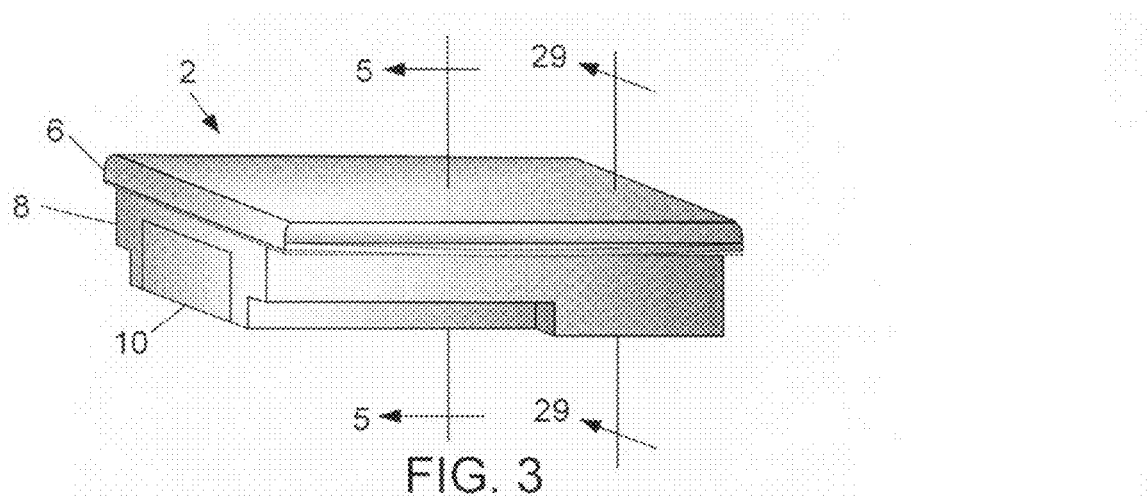
FIG. 3 is a perspective view of the tonneau style pop-up camper in the travel configuration, with major subassemblies identified.

FIG. 3 is a perspective driver's side view, illustrating only the tonneau style pop-up camper 2 in the travel configuration. The main subassemblies of the camper consist of a top module 6, a base module 8 and a utility module 10.

Figure 4:
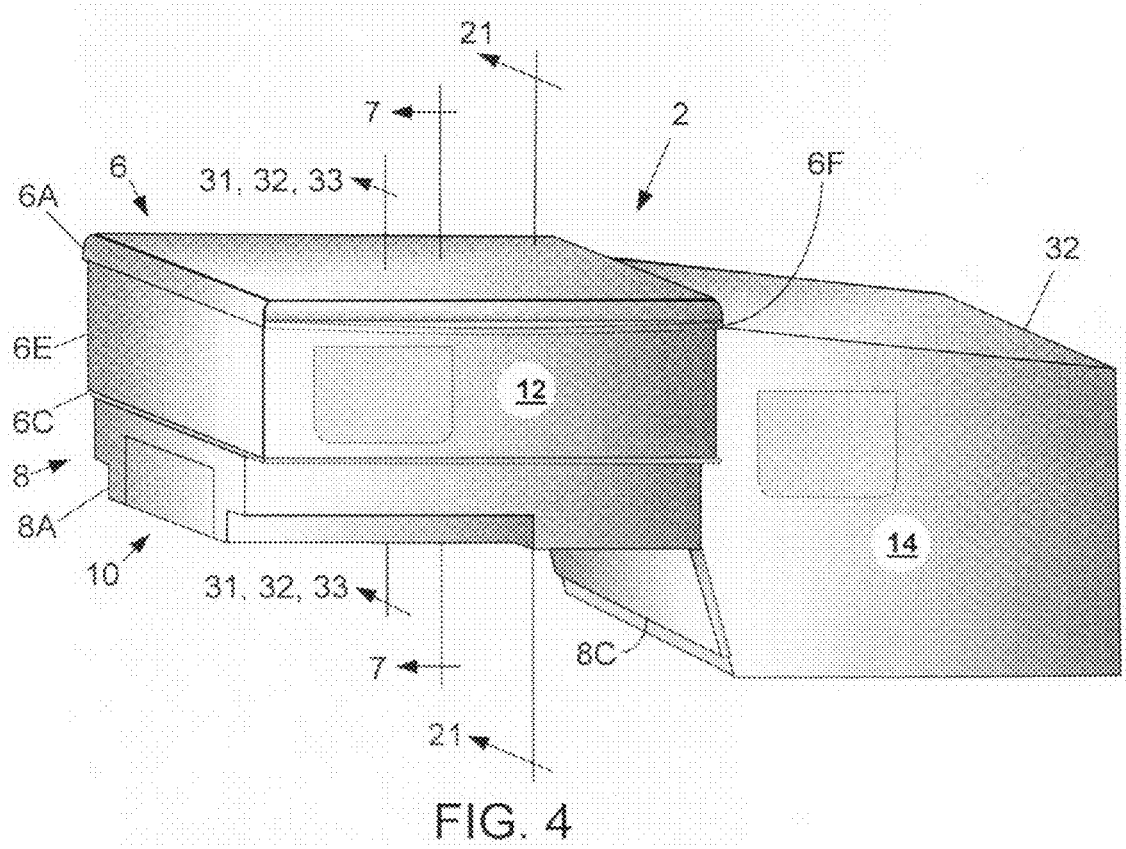
FIG. 4 is a perspective view of the tonneau style pop-up camper in the camping configuration with major sub-assemblies, and some of their subassemblies identified.

FIG. 4 is a perspective driver's side view illustrating only the tonneau style pop-up camper 2 in the camping configuration. The major subassemblies illustrated are: the top module 6, the base module 8, the utility module 10, the sleeping quarters 12, and the living quarters 14.

Shown subassemblies of the top module 6 consist of: a roof shell 6A, a sleeping quarters enclosure 6E, a base frame 6C, and a roof shell handle 6F that runs the full length of the roof shell 6A.

Shown subassemblies of the base module 8 consist of: a base chassis 8A, a camper base tailgate 8C, the living quarters 14, and a living quarters enclosure 32.

Figure 35:
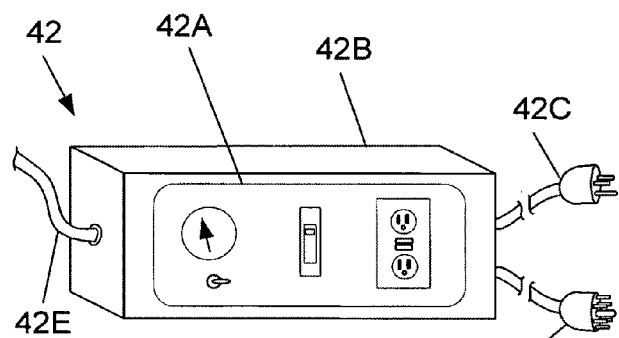
FIG. 35 illustrates the electric control module for the camper's electrical system.
Figure 36:
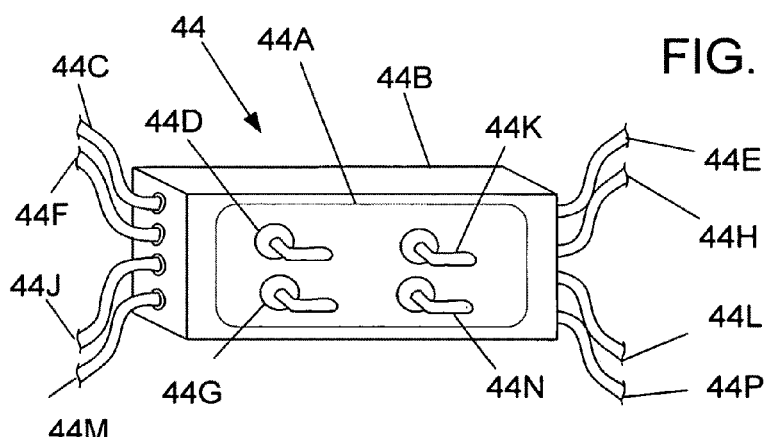
FIG. 36 illustrates the water control module for the camper's water system.

The utility module 10 is part of the utility system that also includes an electric control module 42 (FIG. 35), and a water control module 44 (FIG. 36).

FIGS. 1,2,3,4—Camper, Operation

The tonneau style camper 2 can be transitioned, from the travel configuration (FIGS. 1,3) to the camping configuration (FIGS. 2,4), per the following steps by one person on the ground.

A. Release the hasps (not shown) on both sides of the camper that secure the roof shell 6A to the base frame 6C.

B. Go to the center of either side of the camper 2 and using the full-length roof shell handle 6F raise that side of the roof shell 6A to the full up position.

C. Go to the center of the other side of the camper 2 and using the full length handle 6F raise that side of the roof shell 6A to the full up position.

D. Go to the rear of the camper 2 and lower the camper's base tailgate 8C.

Figure 21:
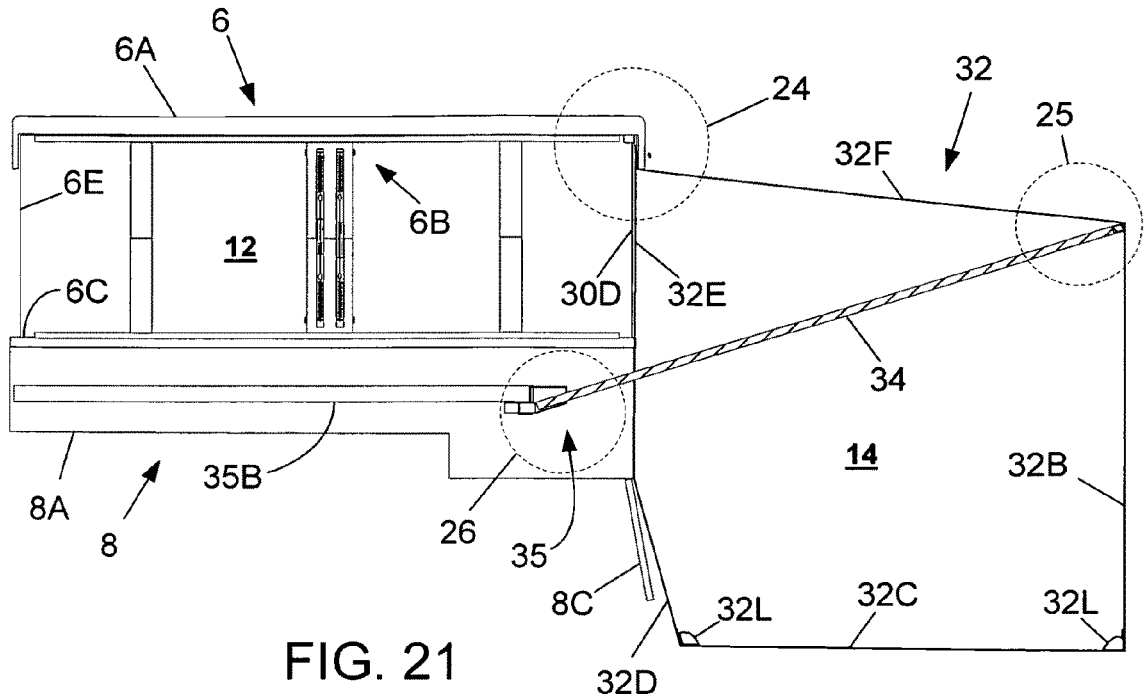
FIG. 21 is a sectional drawing (defined in FIG. 4) of the tonneau style pop-up camper in the camping configuration, illustrating the living quarters, frame extension pole, storage tube, and frame bracket interface.

E. Next, the living quarters enclosure 32 will be changed from the travel configuration to the camping configuration. The details to reconfigure the living quarter's enclosure 32 will be described fully in FIGS. 21 thru 27. In summary, roll out the living quarters enclosure 32 (FIG. 22), pull out the frame extension 34 (FIG. 22) from its storage tube 35B (FIG. 21), which unfolds the living quarters enclosure 32 and secures the frame extension 34 (FIG. 21) in the frame bracket interface 35 (FIG. 21).

F. The camper 2 (FIG. 2,4) is now ready for use. Total time to go from the travel to camping configuration is less than three minutes. If the weather is windy, stakes (not shown) may be required at the corners of the living quarters 14 (FIG. 4).

To transition the tonneau camper 2 from the camping configuration (FIG. 2) to the travel configuration (FIG. 1), reverse the above steps.

FIGS. 1,2,3,4—Camper, Manufacturing

The camper's main subassemblies consist of a top module 6, base module 8, and a utilities module 10. Each main subassembly is made up of additional lower subassemblies. Main subassemblies such as the roof shell 6A, base chassis 8A and the chassis for the utility module 10 are combinations of wood frames, foam, and fiberglass or epoxy coatings. Lower subassemblies with points of high stress are made of a combination of metals, wood, and epoxies or fiberglass. For the sleeping quarters enclosure 6E and living quarters enclosure 32, various types of tent canvas are used.

The stated types of material used to fabricate each assembly and subassemblies are based on a combination of safety, function, stress, aesthetics and cost; however, other materials such as aluminum, composites, synthetics etc. could also be used.

FIGS. 1,2,3,4—Camper, Variations and Conclusions

Although the descriptions above contain many specifics, these should not be construed as limiting the scope of the embodiment, but as merely providing illustrations of some presently preferred embodiments. Any variations on the theme and methodology that are not described here, but accomplishing the same results, would be considered under the scope of the present invention.

Figure 5:
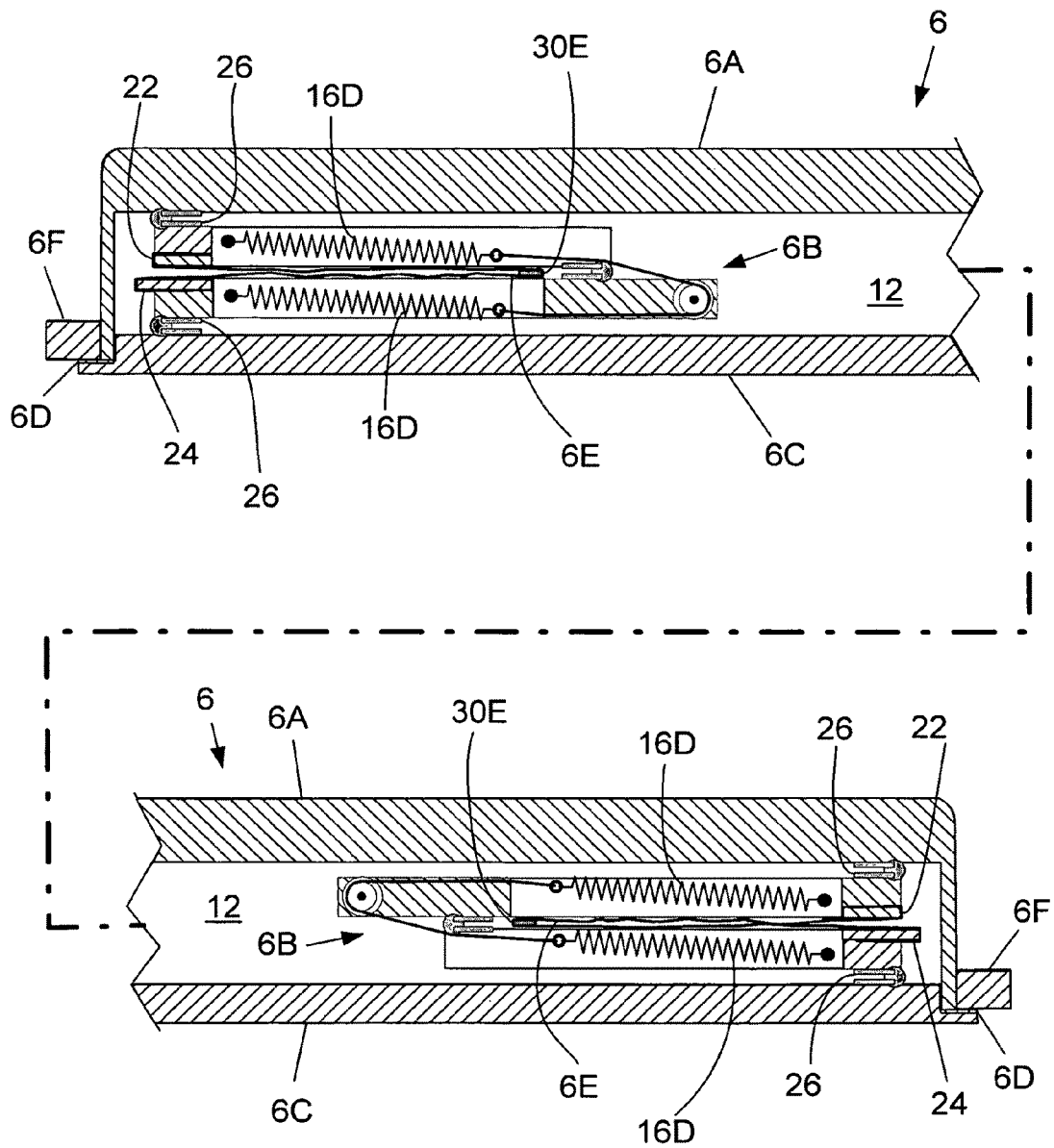
FIG. 5 is a sectional view (defined in FIG. 3) of the top module in the travel configuration illustrating the closed, spring loaded hinged frames.
Figure 6:
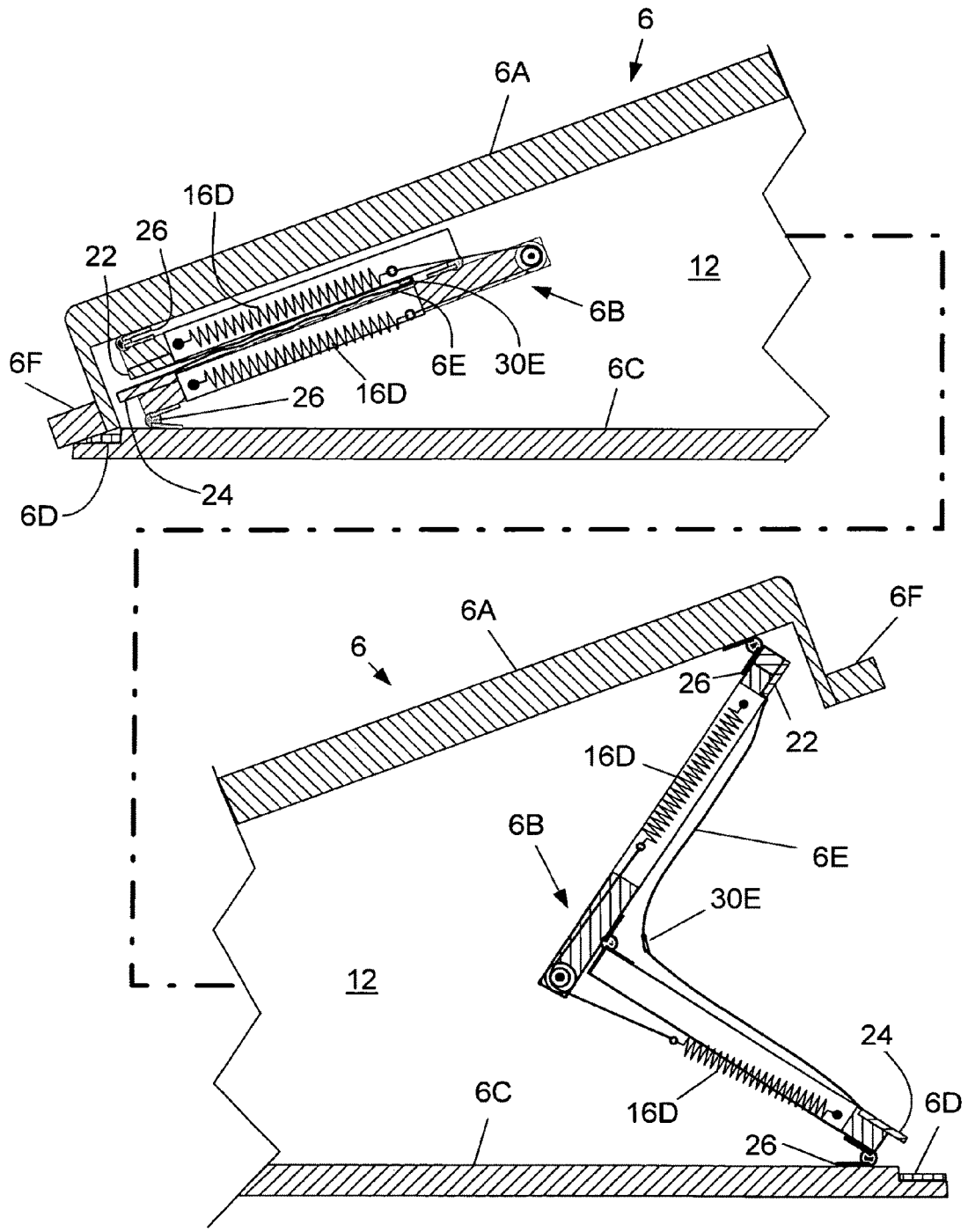
FIG. 6 is a sectional view of the top module illustrating the spring loaded hinged frames when one side of the top module is in the half-open or half-closed position.
Figure 7:
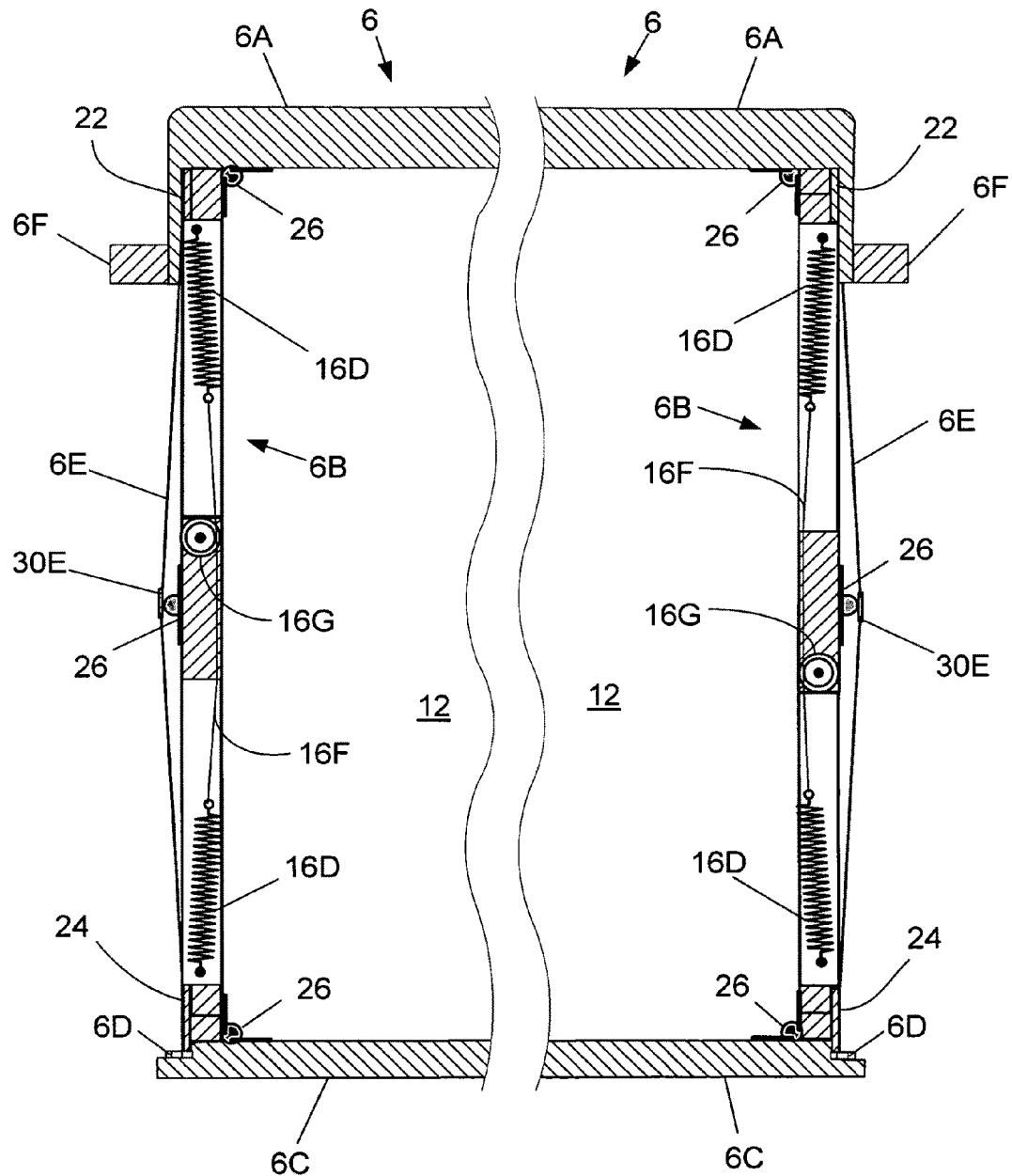
FIG. 7 is a sectional view, (defined in FIG. 4) of the top module illustrating the two spring loaded hinged frames in camping configuration.

FIGS. 5,6,7—Top module Overview

The top module 6, in the travel configuration, is illustrated in the sectional drawing FIG. 5 with the view and direction as defined in FIG. 3.

Said top module 6 consists of the roof shell 6A, a pair of identical spring loaded hinge frames 6B, the sleeping quarters enclosure 6E stored between the arms of the spring loaded hinged frames 6B, and the base frame 6C.

FIGS. 5,6,7—Top Module, Preferred Embodiment

The roof shell 6A is connected, via hinges 26, to the top of the spring loaded hinged frames 6B. The bottom of the spring loaded hinged frames 6B are connected, via hinges 26, to the base frame 6C. The spring loaded hinged frames 6B are identical, but they appear different because they are located on opposite sides of the top module 6. Details of the construction and operation of the spring loaded hinged frame 6B are detailed in FIGS. 8 thru 16C.

A weather seal 6D is attached to the base frame 6C. With the top module 6 in the travel configuration (FIG. 5) and the hasps (not shown) locked, the weather seal 6D is compressed between the roof shell 6A and the base frame 6C creating a weather-tight seal.

The sleeping quarters enclosure 6E is attached to the spring loaded hinged frame 6B by a upper canvas lath 22 and a lower canvas lath 24, and is held folded in the space between the closed arms of the spring loaded hinged frame 6B, by the tension in a stretchable band 30E that stretches around the sleeping quarters 12.

The handles 6F attached to each side of the roof shell 6A run the full length of the roof shell 6A, providing an easy place to grasp when raising and lowering the roof shell 6A during configuration changes.

FIGS. 5,6,7—Top Module, Operation

FIG. 5 illustrates the top module 6 in the travel configuration with both spring loaded hinged frames 6B folded or closed. When the top module 6 is closed as illustrated, the springs 16D in the spring loaded hinged frames 6B are at their maximum tension; however, because of the position of the lever designed into the spring loaded hinged frame 6B, only a fraction of the spring tension is transferred to the "up" direction. When the operator applies additional force upwards against either handle 6F, that side of the roof shell 6A will start moving up. The time required to fully raise both sides of the top module 6 is less than a minute, most of the time being used to walk around to the other side of the camper 2.

FIG. 6 is a sectional view of the top module 6, same as FIG. 5, except the roof shell 6A is transitioning between travel and camping configurations. The sectional drawing's direction and plane are still the same as in FIG. 5, but FIG. 6 has one of the spring loaded hinged frames 6B half way between the travel and camping configurations. The other side of the roof shell 6A has its spring loaded hinged frame 6B in the closed state and it is preventing that side of the roof shell 6A from sliding off of the base frame 6C. The sleeping quarters enclosure 6E is being held towards the spring loaded hinged frame 6B by the stretchable band 30E.

When either spring loaded hinged frame 6B is moving in the up direction, the upward force will increase rapidly, going to a maximum when the leverage of the spring loaded hinged frame 6B is at its mid point as shown in FIG. 6. The upward force will then decrease until the spring loaded hinged frame 6B is in the full open state. The person then goes to the other side and raises that side of the roof shell 6A to the full open position as shown in FIG. 7.

FIG. 7 is a sectional view of the top module 6 in the camping configuration. The direction and plane are the same as in FIGS. 5,6, but both spring loaded hinged frames 6B are fully open in the camping configuration.

Figure 16:
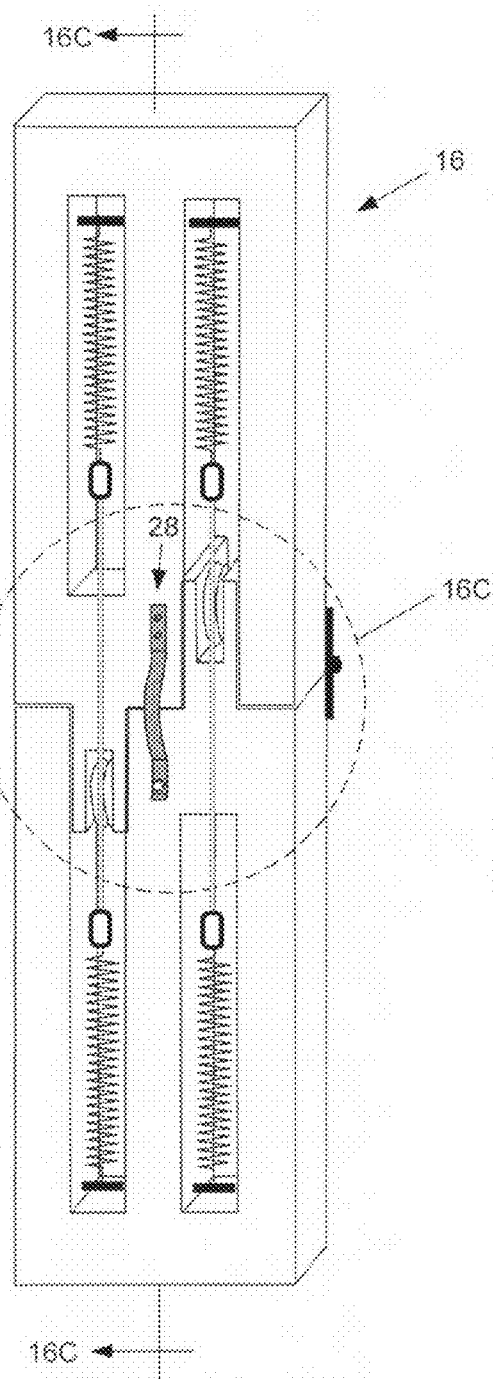
FIG. 16 is a perspective view of the spring loaded hinge with the safety latch assembly (defined for FIGS. 16A,16B, 16C.

When the second spring loaded hinged frame 6B is being raised, fold-back of the first raised spring loaded hinged frame 6B is prevented by an automatic safety latch assembly 28 (FIG. 16). The safety latch assembly 28 (FIG. 16) is not illustrated in FIGS. 5,6,7 because these sectional views are through the springs 16D of the spring loaded hinged frame 6B, and the safety latch assembly 28 (FIG. 16) is at the center of the hinge. For details of the safety latch assembly 28 refer to FIGS. 16,16A,16B,16C.

In addition to the automatic safety latch assembly 28 (FIG. 16), when the spring loaded hinged frames 6B are in the camping configuration (FIG. 7), they tend to remain open and perpendicular to the base frame 6C and roof shell 6A because of the off center location of the hinges 26, the thickness of the spring loaded hinged frames 6B, and the residual force exerted by the springs 16D through the cables 16F against the pulleys 16G.

When in the camping configuration, the bottom interface between the lower part of the spring loaded hinged frame 6B and the base frame 6C, is weatherproofed by the lower canvas lath 24 compressing the weather seal 6D when the roof shell 6A is fully raised. Also the top portion of the sleeping quarters enclosure 6E is attached to the spring loaded hinged frame 6B by the upper canvas lath 22, and is under the sides of the roof shell 6A preventing the weather and insects from entering the sleeping quarters 12.

FIGS. 5,6,7—Top Module, Manufacturing

Refer to "FIGS. 1,2,3,4—Camper, Manufacturing."

FIGS. 5,6,7 Top Module, Variations and Conclusions

Refer to "FIGS. 1,2,3,4—Camper, Variations and Conclusions."

Figure 8:
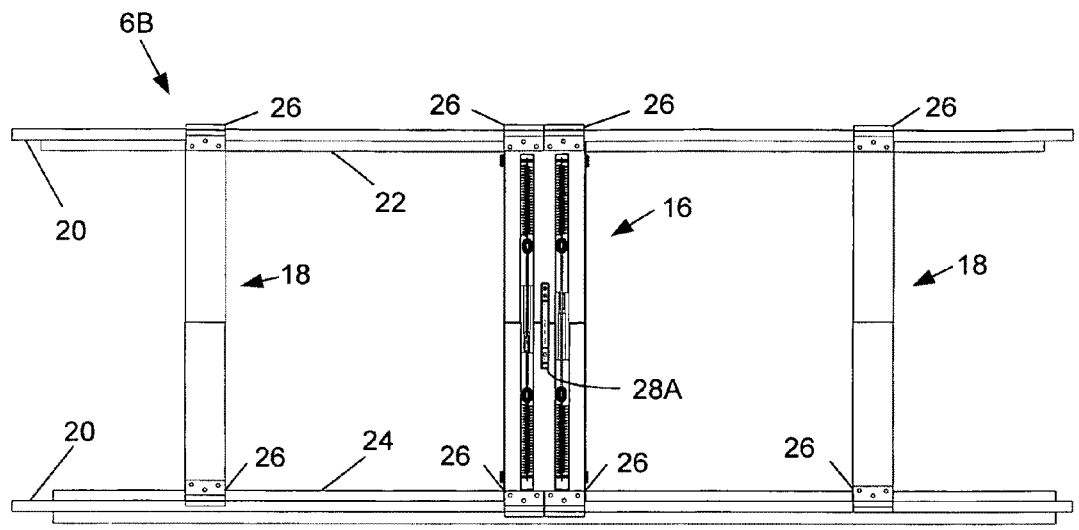
FIG. 8 is a view of the spring loaded hinged frame from inside the camper.
Figure 9:
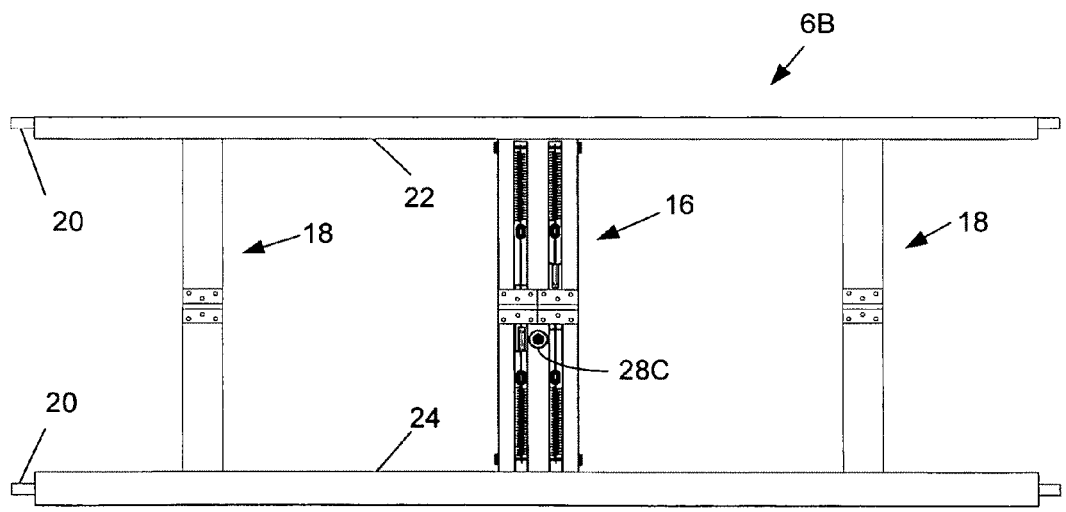
FIG. 9 is a view of the spring loaded hinged frame from the outside of the camper.

FIGS. 8,9—Spring Loaded Hinged Frame, Overview

The spring loaded hinged frame 6B (FIGS. 8,9) enables fast and easy configuration changes to the tonneau style pop-up camper 2 by providing the following:

A. Most of the "up" force so one person can quickly and easily change the tonneau style pop-up camper 2 between travel and camping configurations.

B. A method to stabilize and support each corner of the roof shell 6A (FIG. 4) when it is in the camping configuration.

C. A safety latch assembly 28 to prevent high winds from collapsing the sleeping quarters 12 or the accidental fold-back of the spring loaded hinged frame 6B when changing camper configurations. The safety latch assembly 28 will automatically set when the camper 2 is placed into the camping configuration; and, when the camper 2 is being returned to the travel configuration, release of the safety latch assembly 28A will occur simultaneously with the closing of the spring loaded hinged frame 6B. Refer to FIGS. 16,16A,16B,16C for details of the safety latch assembly 28.

D. Automatic folding and unfolding of the sleeping quarters enclosure 6E when changing camper configurations.

E. Automatic sealing of the top and bottom edges of the sleeping quarters enclosure 6E (FIG. 7) against the environment.

F. Support for the living quarters enclosure 32 (FIG. 4) when in the camping configuration.

G. Support for interface between the sleeping quarters enclosure's 6E and the living quarters enclosure's 32 (FIG. 4).

FIGS. 8,9—Spring Loaded Hinged Frame, Preferred embodiment

FIG. 8 and FIG. 9 illustrate the construction details of the spring loaded-hinged-frame 6B. FIG. 8 is a view of the spring loaded hinged frame 6B looking out from the inside of the sleeping area 12. FIG. 9 is the same spring loaded hinged frame 6B except the view is from outside of the camper, looking into the sleeping quarters 12. Two spring loaded hinged frames 6B are required, one on each side of the top module 6 (FIGS. 5,6,7).

The spring loaded hinged frame 6B is made up of a center located spring loaded hinge 16, attached to top and bottom torsion bars 20, which are attached to two stabilizer hinges 18. The stabilizer hinges 18 are located a distance of about one half of the height of the spring loaded hinged frame 6B from the ends of the spring loaded hinged frame 6B, allowing proper folding of the corners of the sleeping quarters enclosure 6E during configuration changes.

Also attached to the upper torsion bar 20 is the upper canvas anchor lath 22, and attached to the bottom torsion bar 20 is the lower canvas lath 24. The canvas laths 22,24 attach the sleeping quarters enclosure 6E (FIG. 17) to the spring loaded hinged frame 6B.

Along the top torsion bar 20 are the hinges 26 that attach the top of the spring loaded hinged frame 6B to the roof shell 6A (FIG. 7). Along the bottom torsion bar 20 are the hinges 26 that attach the bottom of the spring loaded hinged frame 6B to the base frame 6C (FIG. 7).

FIGS. 8,9—Spring Loaded Hinged Frame, Operation

To raise the roof shell 6A (FIG. 5), first insure all locking hasps (not shown) are opened. Go to the center of either side of the roof shell 6A (FIG. 5). Apply "up" force to the handle 6F (FIG. 5), moving that side of the roof shell 6A to the fully up position, and automatically setting its spring latch 28A (FIG. 8). Go to the center of the other side of the roof shell 6A. Apply "up" force to the handle 6F (FIG. 6), moving the side of the roof shell 6A to the fully up position (FIG. 7), automatically setting its spring latch 28A (FIG. 8). The safety latch assembly 28 is fully detailed in FIGS. 16,16A,16B,16C.

To lower the roof shell 6A (FIG. 7), go to the center of the roof shell 6A on the side to be lowered. Through the wall of the canvas enclosure, apply pressure to the latch release 28C (FIG. 9). The safety spring latch 28A (FIG. 8) will be released, and continued pressure will lower the roof shell 6A (FIG. 7) enabling the handle 6F (FIG. 6) to be grasped and the roof shell 6A (FIG. 5) to be moved to the closed position (FIG. 5). Repeat the operation for the other side.

Figure 10:
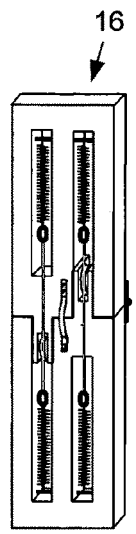
FIG. 10 is perspective view of the spring loaded hinge portion of the spring loaded hinged frame, viewed from inside the camper.

FIGS. 8,9—Spring Loaded Hinged Frame, Manufacturing
Refer to "FIGS. 1,2,3,4—Camper, Manufacturing."
FIGS. 8,9—Spring Loaded Hinged Frame, Variations and Conclusions
Refer to "FIGS. 1,2,3,4—Camper, Variations and Conclusions."
FIGS. 10,11,12,13—Spring Loaded Hinge, Overview
FIGS. 10,11,12,13 detail the spring loaded hinge 16 (FIG. 10), used to provide the "up" force for the spring loaded hinged frame 6B (FIG. 8) when raising or lowering the roof shell 6A (FIG. 7).
FIGS. 10,11,12,13—Spring Loaded Hinge, Preferred Embodiment FIG. 10 illustrates an assembled spring loaded hinge 16 before it becomes part of a spring loaded hinged frame 6B (FIGS. 8,9).

Figure 11:
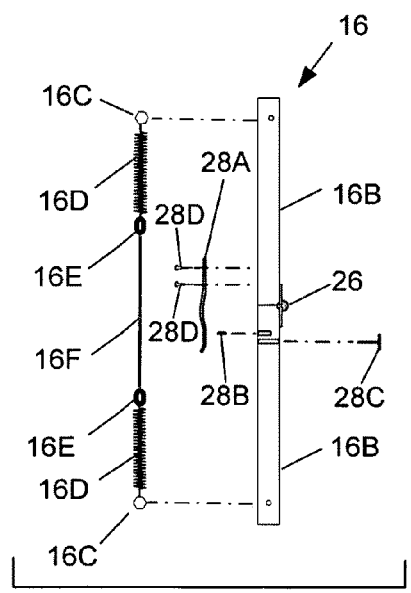
FIG. 11 is an exploded side view of the spring loaded hinge.

FIG. 11 is an exploded view illustrating how the spring loaded hinge 16 is assembled. Two sets of springs 16D, are attached to the upper and lower levered hinge arms 16B (FIG. 13), and are used to power the spring loaded hinge 16. Each spring set consists of a spring anchor bolt 16C, attached to a spring 16D, attached by a cable clamp 16E to a cable 16F, attached to a second cable clamp 16E, attached to a second spring 16D, attached to the second spring anchor bolt 16C.

The spring latch 28A and attaching hardware 28D, a latch catch pin 28B, and a latch release 28C, are part of the safety latch assembly 28 detailed in FIGS. 16,16A,16B,16C.

Figure 12:
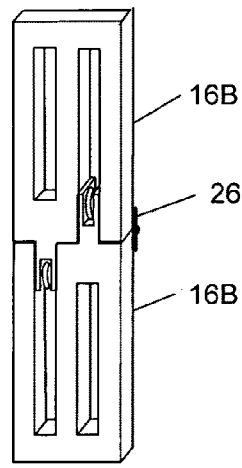
FIG. 12 is a perspective of two identical spring loaded hinge arms, with pulleys, as used in the spring loaded hinge assembly.

FIG. 12 illustrates how two identical levered hinge arms 16B are connected with hinges 26.

Figure 13:
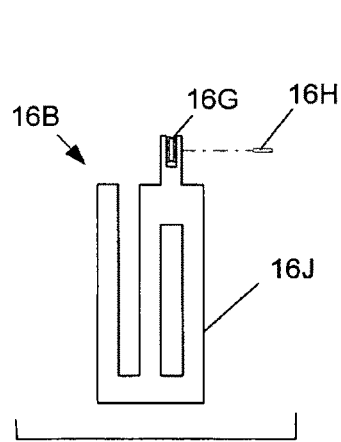
FIG. 13 is an exploded front view of the spring arm, pulley, and axle, used in the spring loaded hinge arm assembly.

FIG. 13 illustrates how a pulley 16G and an axle 16H and an arm 16J are combined to make a levered hinge arm 16B.

FIGS. 10,11,12,13—Spring Loaded Hinge, Operations

A spring loaded hinge 16 (FIG. 10) is part of the spring loaded hinged frame 6B (FIGS. 8,9). During the process of raising or lowering the roof shell 6A (FIG. 6), the springs 16D in the spring loaded hinge 16 (FIG. 6), are close to maximum tension, and the leverage is at maximum, resulting in a large "up" force that will decrease to a minimum "up" force when the spring loaded hinged frame 6B (FIG. 7) goes to the full open state. The residual force in the springs 16D (FIG. 7) will keep tension against the pulleys 16G (FIG. 7) of the spring loaded hinge 16 (FIG. 10); and due to placement of the hinges 26 (FIG. 7) and the thickness of the levered hinge arms 16B (FIG. 7), the spring loaded hinged frame 6B would normally stay in the open position. However, without the safety latch assembly 28 (FIGS. 16,16A,16B,16C), it is possible to have fold back of the open spring loaded hinged frame 6B (FIG. 6) when changing the camper configuration; or during a windy day, it is possible for the spring loaded hinged frame 6B to buckle in. Refer to FIGS. 16,16A,16B,16C for details on the safety latch assembly 28.

FIGS. 10,11,12,13—Spring Loaded Hinge, Manufacturing
Refer to "FIGS. 1,2,3,4—Camper, Manufacturing."
FIGS. 10,11,12,13—Spring Loaded Hinge, Variations and Conclusions The spring loaded hinge 16 could have been designed and assembled with one spring; however, the stretched versus relaxed dimensions and required tension indicated a set of springs was a better solution; and, using a redundant set of spring anchor bolts 16C, springs 16D, cable clamps 16E, and cables 16F provides an increased safety margin, allowing the roof shell 6A to be controllable during configuration changes even if one set of springs 16D and cables 16F should fail.

For additional details, refer to "FIGS. 1,2,3,4—Camper, Variations and Conclusions."

Figure 14:
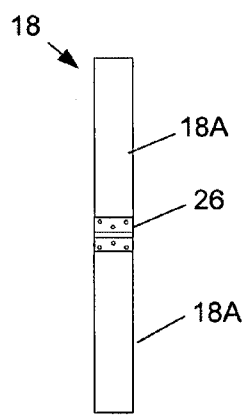
FIG. 14 is a front view of the stabilizer hinge used in the spring loaded hinged frame assembly.
Figure 15:
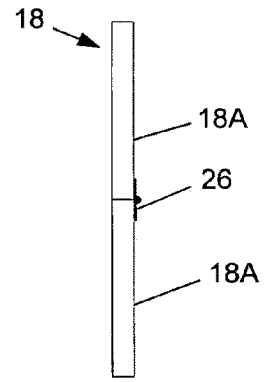
FIG. 15 is a side view of the stabilizer hinge used in the spring loaded hinged frame assembly.

FIGS. 14,15—Stabilizer Hinge Overview

FIG. 14 and FIG. 15 illustrate the construction of a stabilizer hinge 18 made up of two stabilizer hinge arms 18A and a hinge 26. Two stabilizer hinges 18 are used for each spring loaded hinged frame 6B (FIG. 8,9). The stabilizer hinges 18 support the roof shell 6A since they are located near the four corners of the camper roof shell 6A (FIG. 21) and because of the location of two stabilizer hinges 18 at the back corners of the camper, they also support the living quarters enclosure 32 (FIG. 21), and the interface between the sleeping quarter's 12 interface 30D and living quarter's 14 interface 32E (FIG. 21).

FIGS. 14,15—Stabilizer Hinge Preferred Embodiment

FIG. 14 and FIG. 15 illustrate the construction of a stabilizer hinge 18 made up of two stabilizer hinge arms 18A and a hinge 26 as illustrated.

FIG. 14 is a front view of the stabilizer hinge 18 used in the spring loaded hinged frame 6B.

FIG. 15 is a side view of the stabilizer hinge 18 used in the spring loaded hinged frame 6B.

FIGS. 14,15—Stabilizer Hinge Operations

The stabilizer hinges 18 will follow the position of the spring loaded hinge 16 because the torsion bars 20 (FIG. 8) connect the spring loaded hinge 16 to the two stabilizer hinges 18 (FIG. 8,9).

FIGS. 14,15—Stabilizer Hinge, Manufacturing
Refer to "FIGS. 1,2,3,4—Camper, Manufacturing."
FIGS. 14,15—Stabilizer Hinge, Variations and Conclusions
Refer to "FIGS. 1,2,3,4—Camper, Variations and Conclusions."

FIGS. 16,16A,16B,16C—Safety Latch Assembly, Overview

FIG. 16, illustrates the safety latch assembly 28, integrated into the spring loaded hinge 16. The main purpose of the safety latch assembly 28 is:

A. to automatically latch when the camper 2 transitions from the travel configuration (FIG. 1) to the camping configuration (FIG. 2), and B. to prevent fold back of the first raised spring loaded hinged frame 6B, while raising the second spring loaded hinged frame 6B, and C. to prevent collapse of the sleeping quarters 12 (FIG. 2) during windy conditions, and D. to provide a method to release the spring latch 28A while simultaneously closing the spring loaded hinged frame 6B, when changing from the camper configuration (FIG. 2) to the travel configuration (FIG. 1).

FIGS. 16,16A,16B,16C—Safety Latch, Preferred Embodiments

Figure 16A:
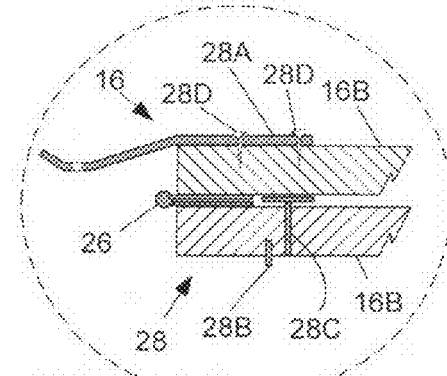
FIG. 16A is the same as enlarged sectional view FIG. 16C except the safety latch assembly and hinge arms are illustrated in the travel configuration.

FIG. 16A is an enlarged portion of the sectional drawing, of the safety latch assembly 28 as defined in FIG. 16, except FIG. 16A illustrates the safety latch assembly 28 when the spring loaded hinge 16 is in the closed or travel configuration.

The safety latch assembly 28 is made up of a spring latch 28A affixed, with attaching hardware 28D, to the upper levered hinge arm 16B of the spring loaded hinge 16, a latch catch pin 28B located in the bottom levered hinge arm 16B surface of the spring loaded hinge 16, and a latch release 28C located in the bottom levered hinge arm 16B of the spring loaded spring hinge 16.

Figure 16B:
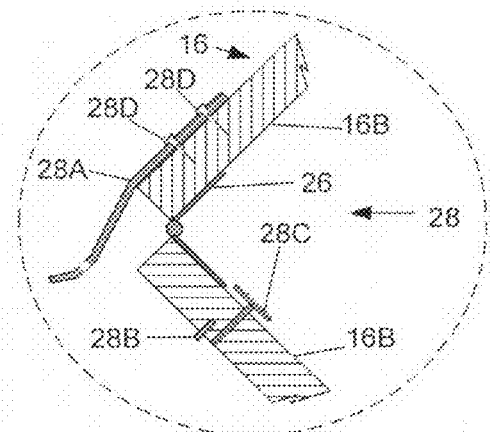
FIG. 16B is the same as the enlarged sectional view FIG. 16C except the safety latch assembly and hinge arms are illustrated in the partially open or partially closed position.

FIG. 16B is a sectional drawing of the enlarged portion of the safety latch assembly 28 as defined in FIG. 16, except FIG. 16B illustrates the safety latch assembly 28 when the spring loaded hinge 16 is in the half open or half closed state. The spring latch 28A has not snapped over the latch catch pin 28B, and the latch release 28C is being retained in its non-interfering location by a retainer (not shown).

Figure 16C:
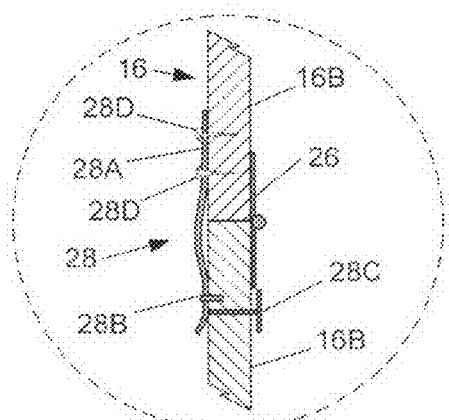
FIG. 16C is an enlarged sectional view, (defined in FIG. 16), showing the safety latch assembly with the hinge arms in the camping configuration.

FIG. 16C is an enlarged portion of the sectional drawing, as defined in FIG. 16. The safety latch assembly 28 is in the camping configuration. The spring latch 28A bridges the joint of the two levered hinged arms 16B on the opposite side from the hinge 26. The top of the spring latch 28A is secured to the top levered hinge arm 16B by attaching hardware 28D. The bottom of the spring latch 28A has snapped over the top of the latch catch pin 28B. The spring loaded hinge 16 is now in the secured camping configuration until the latch release 28C is pressed. The latch release 28C has a retainer (not shown) to prevent the latch release 28C from falling out of its hole.

FIGS. 16,16A,16B,16C—Safety Latch, Operation

The safety latch assembly 28 is automatically latched when the spring loaded hinge 16 is moved from travel configuration (FIG. 16A), to the camping configuration (FIG. 16C).

To close the spring loaded hinge 16, the latch release 28C is pressed to release the spring latch 28A from the latch catch pin 28B, and at the same time additional pressure against the latch release 28C will start the spring loaded hinge 16 to move down so the operator can grasp the handle 6F (FIG. 7) and place the spring loaded hinged frame 6B in the travel configuration (FIG. 5).

FIGS. 16,16A,16B,16C—Safety Latch, Manufacturing

Refer to "FIGS. 1,2,3,4—Camper, Manufacturing."

FIGS. 16,16A,16B,16C—Safety Latch, Variations and Conclusions

Refer to "FIGS. 1,2,3,4—Camper, Variations and Conclusions."

Figure 17:
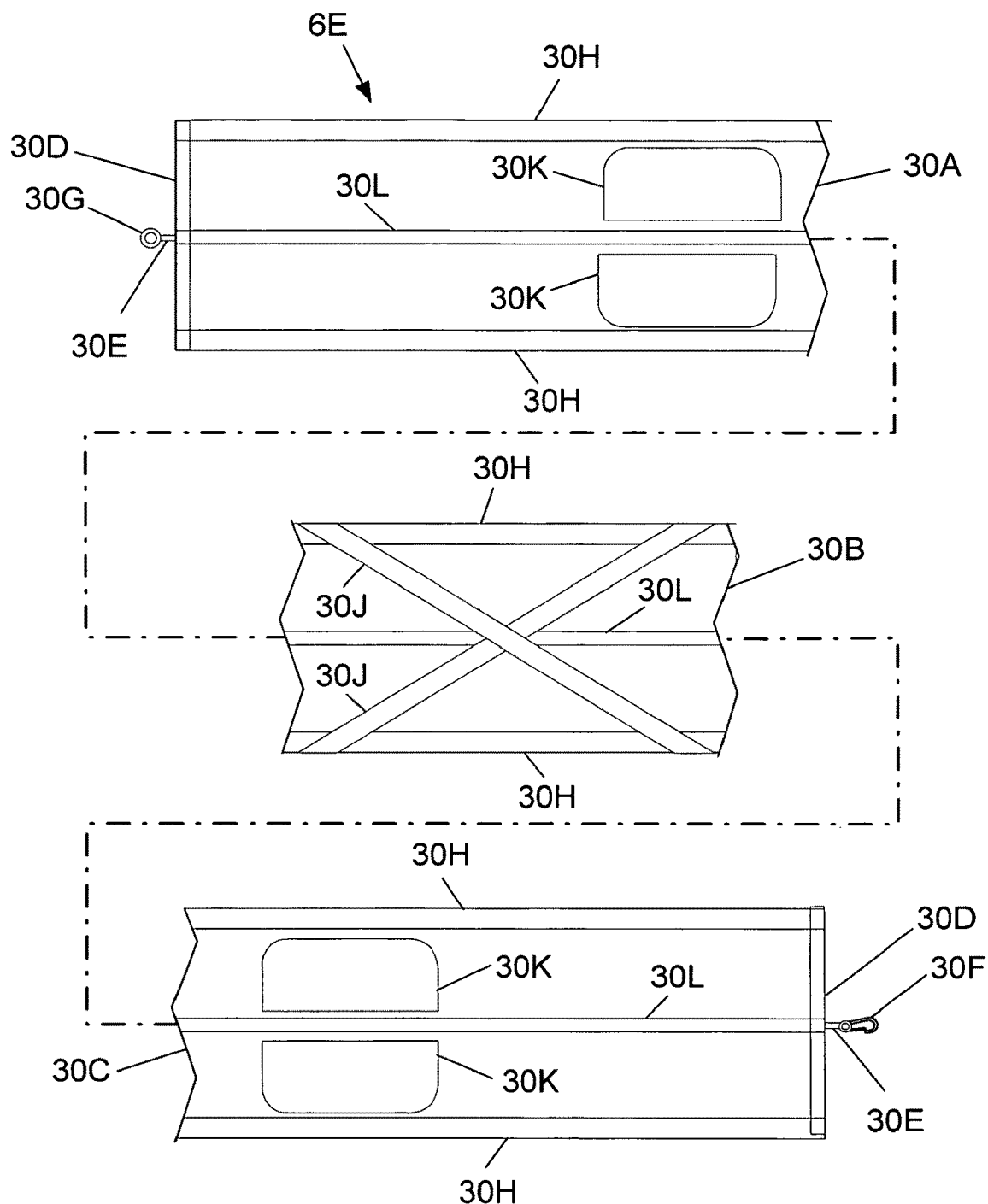
FIG. 17 is a drawing describing the construction of the sleeping quarters enclosure.

FIG. 17—Sleeping Quarters Enclosure, Overview

The sleeping quarters enclosure 6E, protects the campers from the weather and insects, increases structural strength of the sleeping quarters 12 (FIG. 2), and also assists in supporting the living quarters enclosure 14 (FIG. 2).

FIG. 17—Sleeping Quarters Enclosure, Preferred embodiment

FIG. 17 illustrates an inside view of the sleeping quarters enclosure 6E. The sleeping quarters enclosure 6E has three sides, a driver's side 30A, a center 30B, and a passenger's side 30C. The size and number of windows 30K are optional.

Around the top and bottom are lath pockets 30H for the upper canvas laths 22 (FIG. 8,9) and lower canvas laths 24 (FIG. 8,9), used to secure the sleeping quarters enclosure 6E to the spring loaded hinged frames 6B (FIG. 8,9). FIG. 17 also illustrates a stretchable band 30E, inside a pocket 30L, which holds the sleeping quarters enclosure 6E against spring loaded hinged frames 6B (FIG. 8,9) when lowering the camper's roof shell 6A (FIG. 5). The stretchable band 30E has a ring 30G on one end and a snap hook 30F on the other. After the living quarters enclosure 32 (FIG. 22) has been lowered and folded into the back of the camper, the ring 30G and hook 30F are joined, and the stretchable band 30E will pull the sleeping quarters enclosure 6E towards the spring loaded hinged frames 6B (FIG. 5) while lowering the roof shell 6A (FIG. 5).

The sleeping quarter's interfaces 30D (FIG. 21) are joined to the living quarter's interfaces 32E (FIG. 21) and form a weatherproof interface.

When both spring loaded hinged frames 6B (FIG. 7) are raised, the center 30B of the sleeping quarters enclosure 6E (FIG. 17) forms the equivalent of two right triangles adding strength against high winds. Also, the sleeping quarters enclosure 6E has cross web bracing 30J reinforcement sewed into the front section of the canvas. The webbing is anchored to the roof shell 6A and base frame 6C, to insure the right triangles will form, even if the canvas is wet, loose, torn, or stretched.

FIG. 17—Sleeping Quarters Enclosure, Operation

When changing the camper 2 from the travel configuration (FIG. 1) to the camping configuration (FIG. 2), the sleeping quarters enclosure 6E is automatically deployed when the roof shell 6A is raised.

Figure 29:
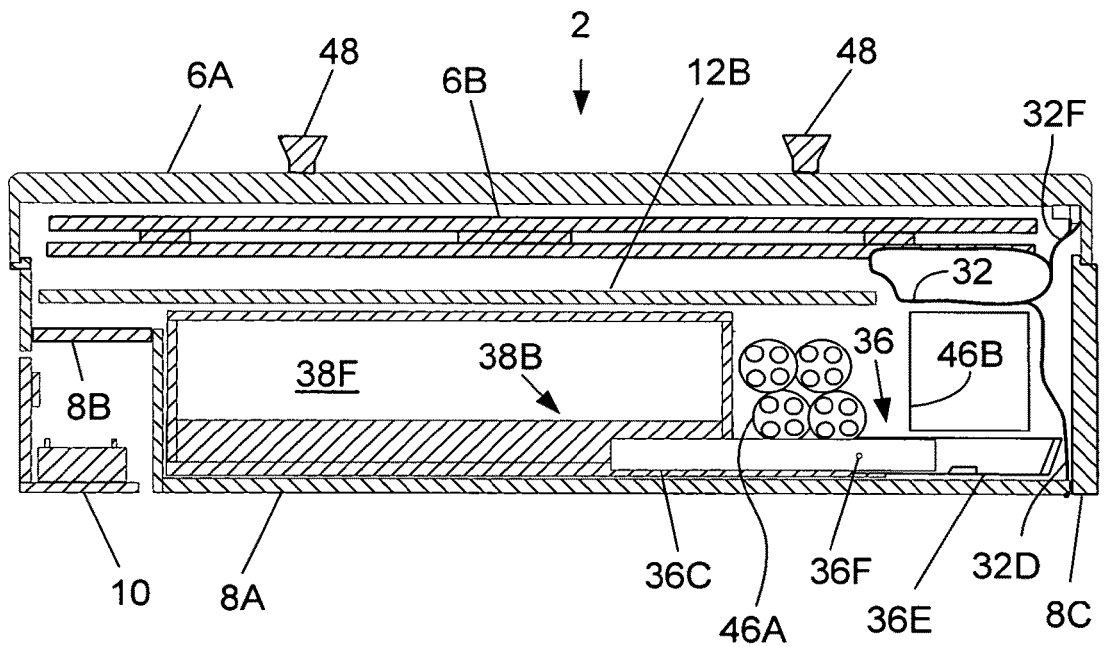
FIG. 29 is a sectional side view, (defined in FIG. 3), of the tonneau style camper in the travel configuration, illustrating storage of the attached folding stairs and storage of other large items such as folding chairs, ice chests, etc.

When changing the camper 2 from the camping configuration (FIG. 2) to the travel configuration (FIG. 1), after folding the living quarters enclosure 32 (FIG. 22) into its storage area indicated in FIG. 29 and connecting the hook 30F and ring 30G on the stretchable band 30E, the sleeping quarters enclosure 6E will automatically be folded and stored when the roof shell 6A is lowered to the closed condition.

FIG. 17—Sleeping Quarters, Manufacturing

Refer to "FIGS. 1,2,3,4—Camper, Manufacturing."

FIG. 17—Sleeping Quarters, Variations and Conclusions

Refer to "FIGS. 1,2,3,4—Camper, Variations and Conclusions."

Figure 18:
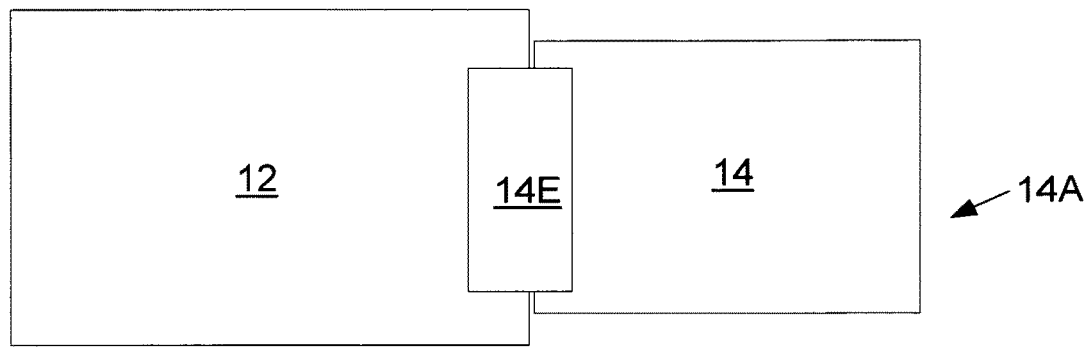
FIG. 18 is basic floor plan of the tonneau style pop-up camper for two people in the sleeping quarters, and standard living quarters that can be converted into a part-time sleeping area for additional campers by using folding cots and sleeping bags.
Figure 19:
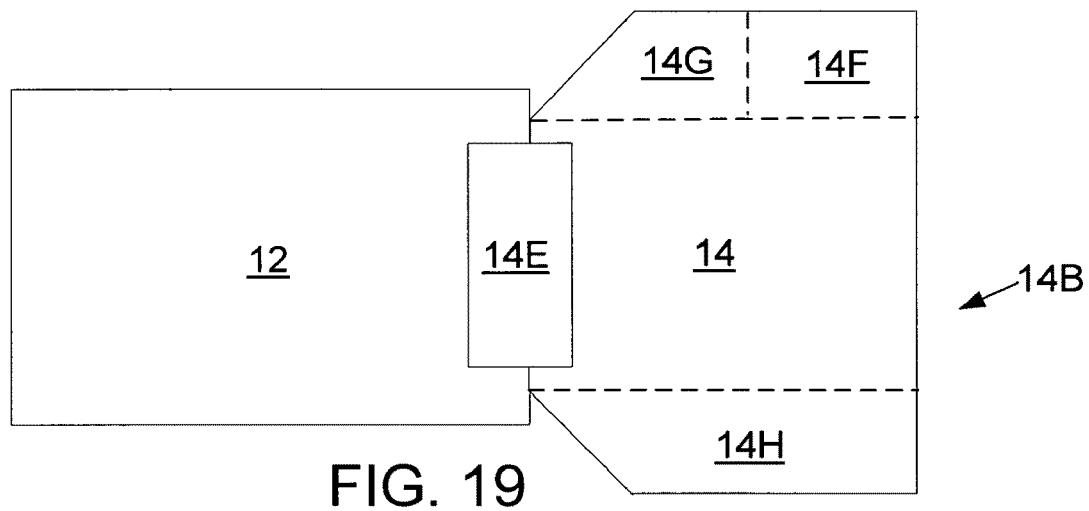
FIG. 19 is a floor plan of the tonneau style pop-up camper for two people in the sleeping quarters, and standard living quarters with side spaces added for a folding cot, shower, and portable toilet room.
Figure 20:
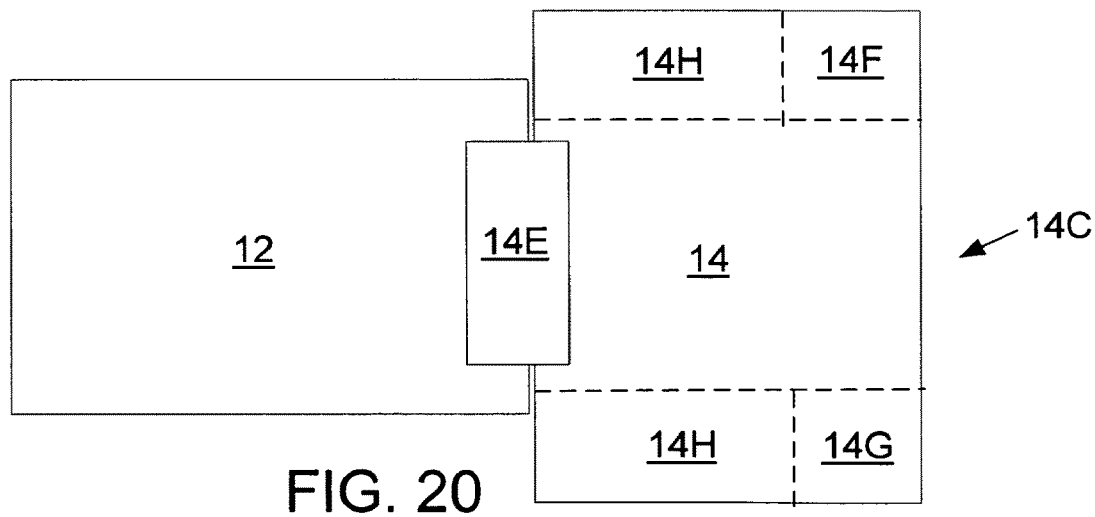
FIG. 20 is a floor plan of the tonneau style pop-up camper for two people in the sleeping quarters, and a standard living quarters with side spaces for two folding cots, shower, and portable toilet room.

FIGS. 18,19,20—Floor Plans, Overview

The floor plan, option A 14A (FIG. 18) is the basic layout for the tonneau style pop-up camper 2 (FIG. 2) and is adequate for two adults', or two adults and two children; however, space may be tight for four adults even if additional sleeping bags or cots are set up in the living quarters 14. By modifying the living quarters enclosure 32 (FIG. 17) and frame extension 34 (FIG. 21), the size of the living quarters 14 can be increased as indicated in FIGS. 19,20.

FIGS. 18,19,20—Floor Plans, Preferred embodiment

FIG. 18 illustrates the basic floor plan option A 14A, for the tonneau style pop-up camper 2 (FIG. 2). The main sleeping quarters 12, is located in the top portion of the pickup's truck bed, and is approximately the size of a queen size bed. The main living quarters 14 can also be used for additional sleeping area by use of folding cots or sleeping bags.

Figure 28:
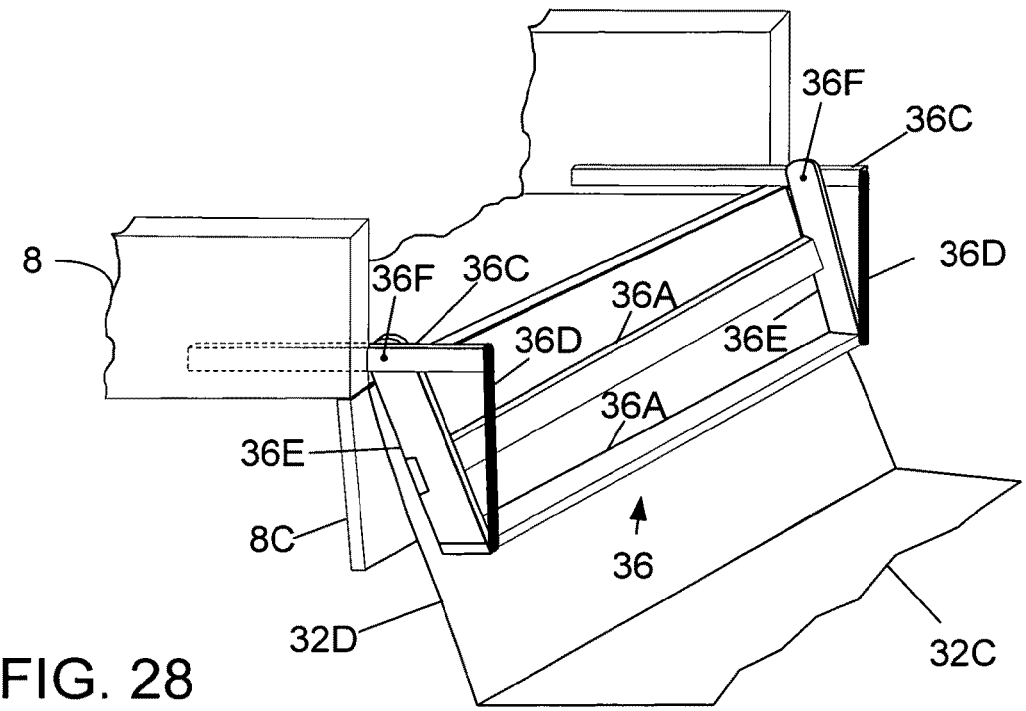
FIG. 28 is a perspective view of the foldable stairs, in the camping configuration, between the living and sleeping quarters.

The transition area 14E, between the living quarters 14 and sleeping quarters 12, is designed for a number of purposes such as:
  A. easy access between the sleeping quarters 12 and living quarters 14 via the attached folding stairs 36 (FIG. 28), or
  B. accessing the cabinet set 38 described in FIGS. 30,31, 32,33, or
  C. some combination of counters 38D (FIG. 30), cabinets 38E (FIG. 30), storage bins 38F (FIG. 30), and stairs 36 (FIG. 28).

FIG. 19 illustrates a floor plan, option B 14B, that has the same steeping area 12, transition area 14E, and living quarters 14 as described for option A 14A (FIG. 18) plus additional area for a sleeping bag or folding cot 14H, a portable toilet 14G, and a shower 14F. Or, the extra area could be used for additional living area in the day and additional sleeping area at night.

FIG. 20 illustrates a floor plan, option C 14C, that has the same sleeping area 12, transition area 14E, and living quarters 14 as described for option A (FIG. 18), plus extra space for two sleeping bags or folding cots 14H, a portable toilet 14G, and a shower 14F. Or, the extra area could be used for additional living area in the day and additional sleeping area at night.

FIGS. 18,19,20—Floor Plans, Operation

Reconfiguration time for the floor plan of FIG. 18 is less than a couple of minutes; however, for the floor plans of FIGS. 19 and 20 the configuration changes would require some additional small amount of time because the living quarters enclosure 32 would be larger, and the frame extension 34 would be more complicated.

FIGS. 18.19,20—Floor Plans Module, Manufacturing

Refer to "FIGS. 1,2,3,4—Camper, Manufacturing."

FIGS. 18.19,20—Floor Plans, Variations and Conclusions

The living quarters 14 (FIG. 2) can be sized and arranged in many different configurations; however, they all will require some degree of changes to the frame extension 34 and living quarters enclosure 32.

For additional details, refer to "FIGS. 1,2,3,4—Camper, Variations and Conclusions."

Figure 22:
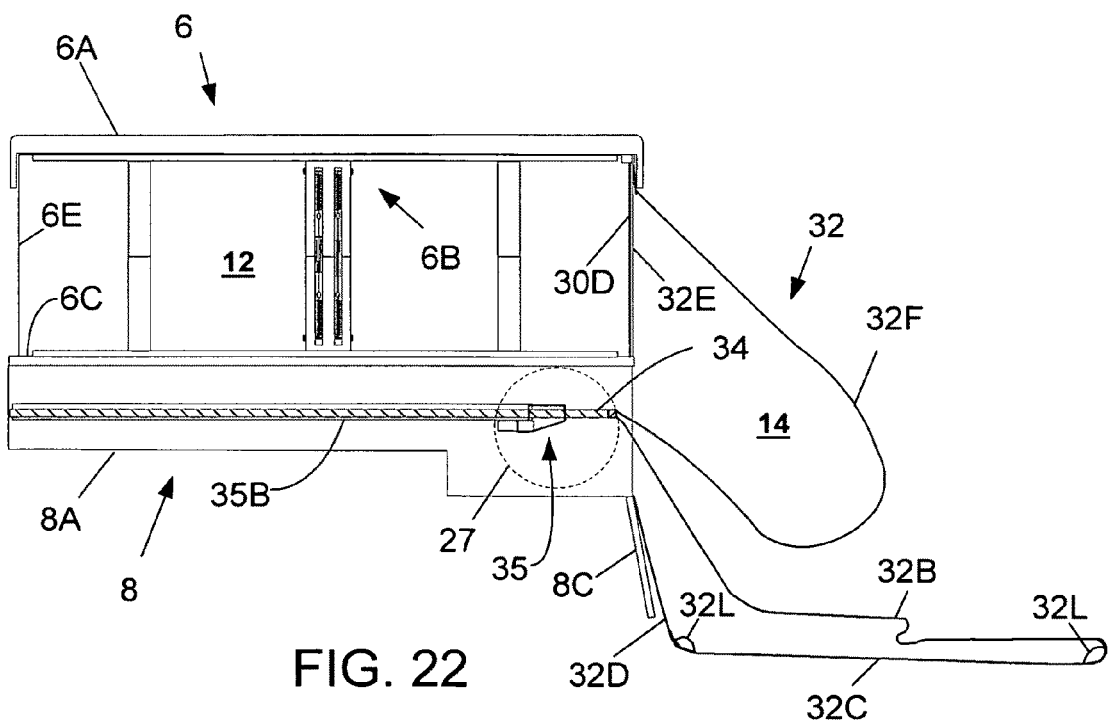
FIG. 22 is a sectional perspective drawing of the tonneau style pop-up camper illustrating the partially erected living quarter's enclosure, frame extension in the storage tube and frame bracket interface.

FIGS. 21,22—Base Module, Top module and Living Quarters, Overview

FIGS. 21,22, describe how the living quarters enclosure 32 is attached to and supported by the top module 6, sleeping quarters enclosure 6E, and base module 8.

FIGS. 21,22—Base Module, Top module and Living Quarters, Preferred embodiment FIG. 21 is a sectional drawing as defined in FIG. 4. The top module 6 is made up of the roof shell 6A, spring loaded hinged frame 6B, sleeping quarters enclosure 6E and the base frame 6C. The base frame 6C is attached to the campers base module 8.

The sectional view of the base chassis 8A illustrates the location of the storage tube 35B, and the frame bracket interface 35 attached to the inside surface of the base chassis 8A.

The frame extension 34 extends from the frame bracket interface 35, to the junction between the roof 32F and front 32B of the living quarters enclosure 32, and is held in place by the weight of the living quarters enclosure 32. Refer to the enlarged sectional view FIGS. 24,25,26 for more details.

The sectional view of the living quarters 14 illustrates the living quarters enclosure's 32 roof 32F, front 32B, floor 32C tailgate canvas 32D and the living quarters interface 32E attached to the sleeping quarters interface 30D.

FIG. 22 is the same as FIG. 21 except the frame extension 34 has been slid into the storage tube 35B. Refer to the enlarged sectional view FIG. 27 for more details. The living quarters enclosure 32 is now ready to be folded into its storage area as shown in FIG. 29.

FIGS. 21,22—Base Module, Top module and Living Quarters, Operation

Figure 26:
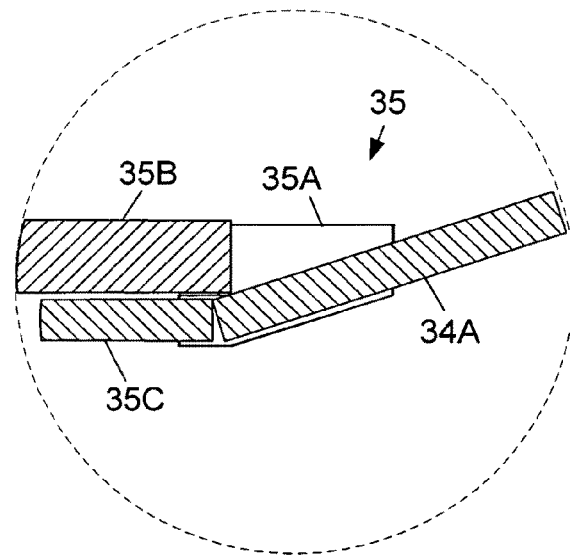
FIG. 26 is an enlarged view, (defined in FIG. 21), showing how the frame extension pole is anchored by the guide bracket and stop block, when the camper is in the camping configuration.

Once the top module 6 is erected, the stretchable band 30E (FIG. 17), around the sleeping quarters enclosure 6E (FIG. 17), has been unhooked, and the living quarters enclosure 32 has been unrolled onto the ground, then the living quarters 14 are erected by grasping the frame cross member 34B (FIG. 23A) and pulling it from the storage tube 35B until both frame extension poles 34A (FIG. 26) drop against the stop block 35C (FIG. 26) in the guide bracket 35A (FIG. 26). Normally the floor 32C of the living quarters 14 is held in place by small weights 32L attached to the corners of the floor; however, during windy conditions, tent stakes (not shown) may be required to secure the floor corners of the living quarters enclosure 32.

Time required to change the camper 2 (FIG. 1) from the travel configuration to the camping configuration (FIG. 2) requires less than two minutes, or three minutes if stakes are required.

FIGS. 21,22—Base Module, Top module and Living Quarters, Manufacturing

Refer to "FIGS. 1,2,3,4—Camper, Manufacturing."

FIGS. 21,22—Base Module, Top module and Living Quarters, Variations and Conclusions Refer to "FIGS. 1,2,3,4—Camper, Variations and Conclusions."

Figure 23:
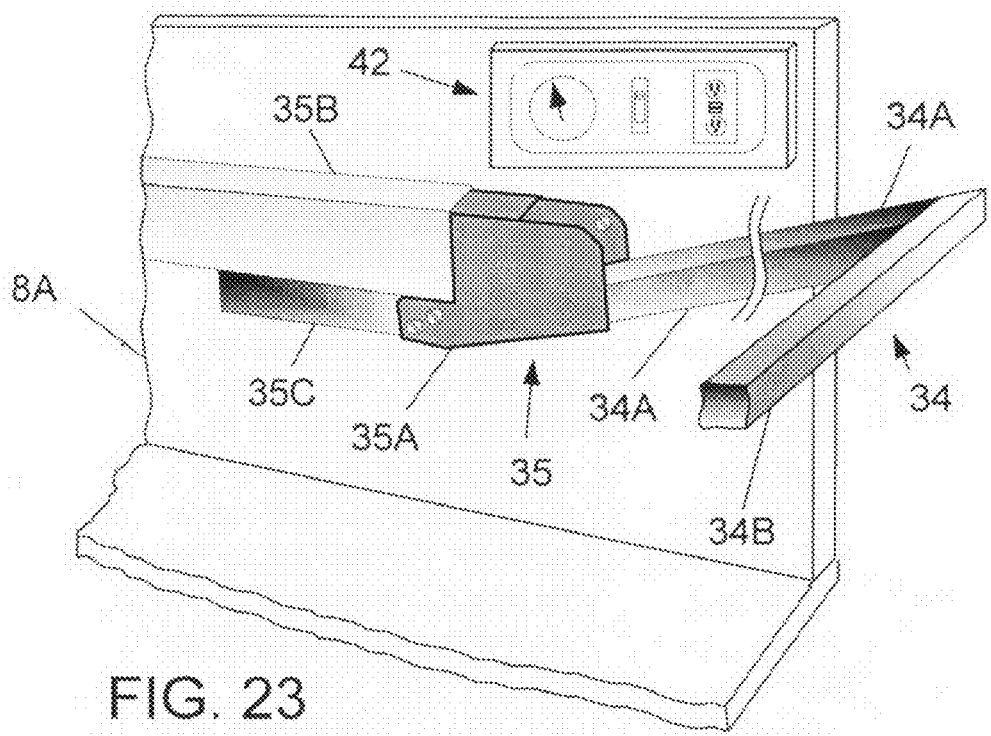
FIG. 23 is a perspective drawing of the frame bracket interface, the frame extension in the camping configuration, and the electric control module located on the passenger side of the camper's base chassis.
Figure 23A:
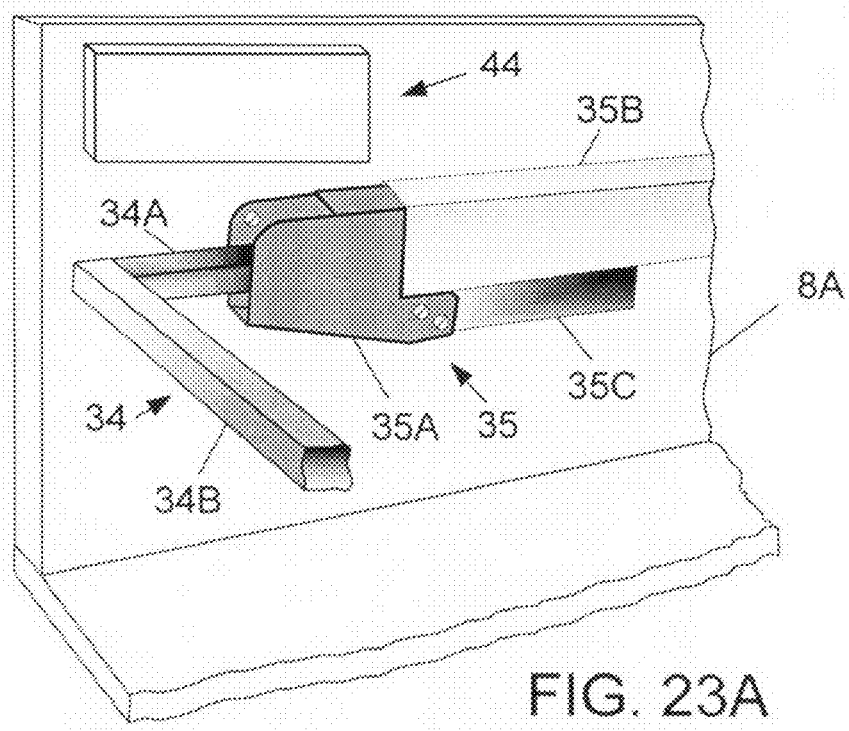
FIG. 23A is a perspective drawing of the frame bracket interface, the frame extension in the travel configuration, and the backside of the water control panel, located on the driver's side of the camper base chassis.

FIGS. 23,23A—Frame Bracket, Overview

The frame bracket interface 35 enables the camper 2 (FIGS. 1,2) to transition quickly and easily between the travel configuration (FIG. 1) and camping configuration (FIG. 2).

FIGS. 23,23A—Frame Bracket, Preferred embodiment

FIG. 23 is a perspective drawing of the passenger side, inside wall, of the base chassis 8A. The frame bracket interface 35, with the guide bracket 35A, storage tube 35B, stop block 35C, and frame extension 34 are shown in the camping configuration. The frame extension 34 is made up of two frame extension poles 34A and the frame cross member 34B.

Also shown is the electric control module 42 located on the passenger side of the camper base chassis 8A. Refer to FIG. 35 for the discussion of the electric control module 42.

FIG. 23A is a perspective drawing of the driver side, inside wall, of the base chassis 8A. The frame bracket interface 35, with the guide bracket 35A, storage tube 35B stop block 35C and frame extension 34 are shown in the travel configuration. The frame extension 34 is made up of two frame extension poles 34A and the frame cross member 34B.

Also shown is the backside of the water control module 44 located on the driver's side of the camper base chassis 8A. Refer to FIG. 36 for the discussion of the water control module 44.

FIGS. 23,23A—Frame Bracket, Operation

The frame bracket interface 35 is designed to store, guide and secure the frame extension 34. In the travel configuration the frame extension poles 34A are inside the storage tubes 35B, and the frame cross member 34B is held in place by the camper's base tailgate 8C (FIG. 22).

To convert the living quarters 12 from the travel to camping configuration, the frame extension 34 (FIG. 23A) is pulled out until the tension on the roof 32F (FIG. 21) of the living quarters enclosure 32 raises the frame cross member 34B up (FIG. 23), and the ends of the frame extension 34 drop down inside the frame bracket interface 35 and rest against the stop block 35C.

To convert the camper 2 from the camping to travel configuration, the frame extension 34 (FIG. 23) is pulled out about an additional inch and then raised and slid into the storage tube 35B (FIG. 23A).

Figure 24:
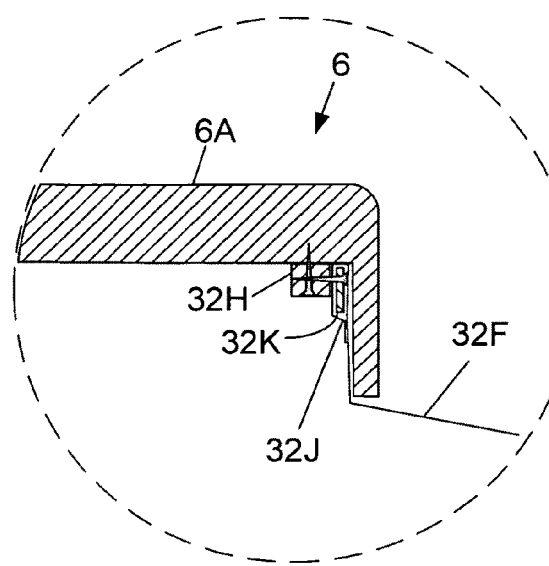
FIG. 24 is an enlarged view, (defined in FIG. 21), showing how the roof of the living quarters enclosure is interfaced to the roof shell of the tonneau style pop-up camper.
Figure 25:
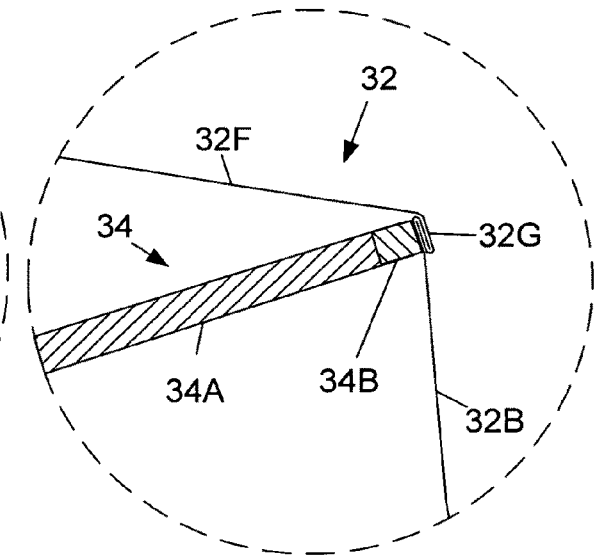
FIG. 25 is an enlarged view, (defined in FIG. 21), showing how the roof of the living quarters enclosure is attached to the frame cross member.

FIGS. 23,23A—Frame Bracket, Manufacturing
  Refer to "FIGS. 1,2,3,4—Camper, Manufacturing."
FIGS. 23,23A—Frame Bracket, Variations and Conclusions
  Refer to "FIGS. 1,2,3,4—Camper, Variations and Conclusions."
FIGS. 24,25—Living Quarters Attachment, Overview The attachment of the living quarter's roof 32F to the roof shell 6A shall be able to handle the weight of the living quarters enclosure 32 in wet and windy conditions. In addition, for manufacturing purposes, it shall be possible to replace the living quarters enclosure 32 (FIG. 21) without disassembly of the top module 6, frame extension, 34 or the base module 8 (FIGS. 21,22).

FIGS. 24,25—Living Quarters Attachment, Preferred Embodiment

FIG. 24 is an enlarged view, (defined in FIG. 21), showing how the living quarters roof 32F is interfaced to the roof shell 6A of the top module 6.

The living quarters roof 32F has a roof lath pocket 32J sewed into edge of the roof 32F. A roof lath 32K is inserted into the roof lath pocket 32J and is then screwed to the roof shell anchor 32H. The roof shell anchor 32H is then screwed to the roof shell 6A.

FIG. 25 is an enlarged view, (defined in FIG. 21), showing how the roof and front seam 32G between the living quarters roof 32F and the living quarters front 32B (FIG. 21) is attached to the frame cross member 34B of the frame extension 34.

FIGS. 24,25—Living Quarters Attachment, Operation

The living quarters enclosure 32 (FIG. 21) can be removed, for replacement or repair, from the camper's top module 6 (FIG. 21) and the base module 8(FIG. 21) by the following steps:
  A. Configure the camper 2 into the camping configuration illustrated in FIG. 21.
  B. Open the interface between the tailgate canvas 32D (FIG. 21) and the base chassis 8A (FIG. 21).
  C. Open the interface between the sides of the base chassis 8 and the living quarters enclosure 32.
  D. Open the interface between the sleeping quarters enclosure's 6E interface 30D (FIG. 21) and the living quarters enclosure's 32 interface 32E (FIG. 21).
  E. Open the bond between the roof and front seam 32G (FIG. 25) and the frame cross member 34B (FIG. 25).
  F. Remove the roof shell anchor 32H (FIG. 24) from the roof shell 6A.
  G. The living quarters enclosure 32 (FIG. 21) can now be separated from the camper 2 (FIG. 21).

Figure 27:
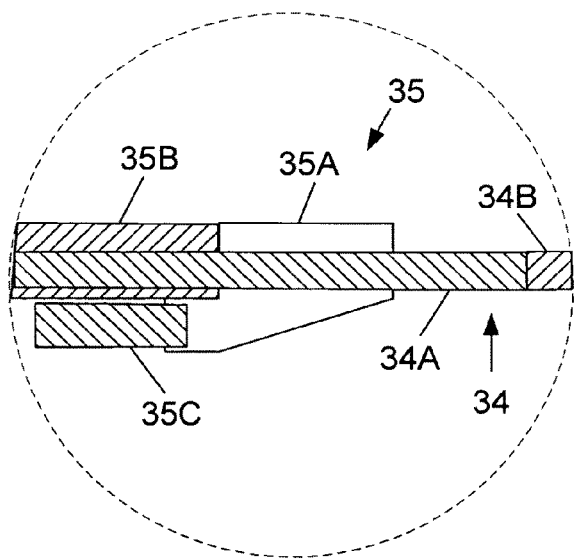
FIG. 27 is an enlarged view, (defined in FIG. 22), showing how the frame extension pole is stored in the guide bracket and storage tube, when the camper is in the travel configuration.

FIGS. 24,25—Living Quarters, Manufacturing
  Refer to "FIGS. 1,2,3,4—Camper, Manufacturing."
FIGS. 24,25—Living Quarters, Variations and Conclusions
  Refer to "FIGS. 1,2,3,4—Camper, Variations and Conclusions."
FIGS. 26,27—Frame Bracket Detailed Sectional Drawing—Overview FIG. 26 is an enlarged sectional view, (defined in FIG. 21), showing the internal details of the frame bracket interface 35, when the camper 2 is in the camping configuration (FIG. 2).

FIG. 27 is an enlarged sectional view, (defined in FIG. 22), showing the internal details of the frame bracket interface 35, when the camper 2 is in the travel configuration (FIG. 1).

FIGS. 26,27—Frame Bracket Detailed Sectional Drawings Embodiment

FIG. 26 illustrates the internal details of the frame bracket interface 35 with the frame extension pole 34A in the camping configuration. The guide bracket 35A is coupled to the empty storage tube 35B and frame extension pole 34A is braced against the stop block 35C.

FIG. 27 illustrates the internal details of the frame bracket interface 35 with the frame extension pole 34A and frame cross member 34B when they are in the travel configuration and stored in the storage tube 35B. The guide bracket 35A is coupled to the storage tube 35B and the stop block 35C.

FIGS. 26,27—Frame Bracket Detailed Sectional Drawing, Operations

To convert the camper 2 from the travel (FIG. 27) to camping configuration (FIG. 26), the frame extension 34 is pulled out until the tension on the roof 32F (FIG. 21) of the living quarters enclosure 32 raises the frame extension 34 (FIG. 21) up, and the ends of the frame extension 34 drop down inside the frame bracket interface 35 (FIG. 26) and rest against the stop block 35C.

To convert the camper 2 (FIG. 2) from the camping to travel configuration (FIG. 27), the frame extension 34 is pulled out about an additional inch, raised up and guided into the storage tube 35B. The frame extension 34 is secured in the storage tube 35B by the camper's base-tailgate 8C (FIG. 22) when it is closed.

FIGS. 26,27—Frame Bracket Detailed Manufacturing
  Refer to "FIGS. 1,2,3,4—Camper, Manufacturing."
FIGS. 26,27—Frame Bracket Detailed Variations and Conclusions
  Refer to "FIGS. 1,2,3,4—Camper, Variations and Conclusions."
FIG. 28—Attached Folding Stairs, Overview FIG. 28 illustrates the attached folding stairs 36 configured for access between the sleeping quarters 12 (FIG. 2) and living quarters 14 (FIG. 2). When the camper is in the travel configuration the folding stairs 36 (FIG. 29) are flat and located on the floor of the base chassis 8A.

FIG. 28—Attached Folding Stairs, Preferred Embodiment

FIG. 28 illustrates the steps 36A running the full internal width of the base module 8, and attached to two stringers 36E, attached to two stringer pivots 36F, mounted in the sliding horizontal supports 36C, attached to side walls of the base module 8. Holding the steps 36A, at the proper angle are two support straps 36D between the bottom step 36A and sliding horizontal support 36C.

FIG. 28—Attached Folding Stairs, Operations

When the camper 2 (FIG. 1) is in the travel configuration, the attached folding stairs 36 are stored flat as illustrated in FIG. 29. The travel configuration of the attached folding stairs 36 can be changed to the camping configuration as follows:
  A Configure the camper 2 to the camping configuration (FIG. 2). Relative to FIG. 29 the roof shell 6A has to be raised, the tailgate 8C has to be opened, the living quarters enclosure 32 has to be deployed, and ice chest(s) 46B, folding camp chairs 46A and such items have to be moved to the living quarters 14.
  B Pull the attached folding stairs 36 out into the living quarters 14 (FIG. 2) and pivot the stringers 36E down as illustrated in FIG. 28.

Figure 30:
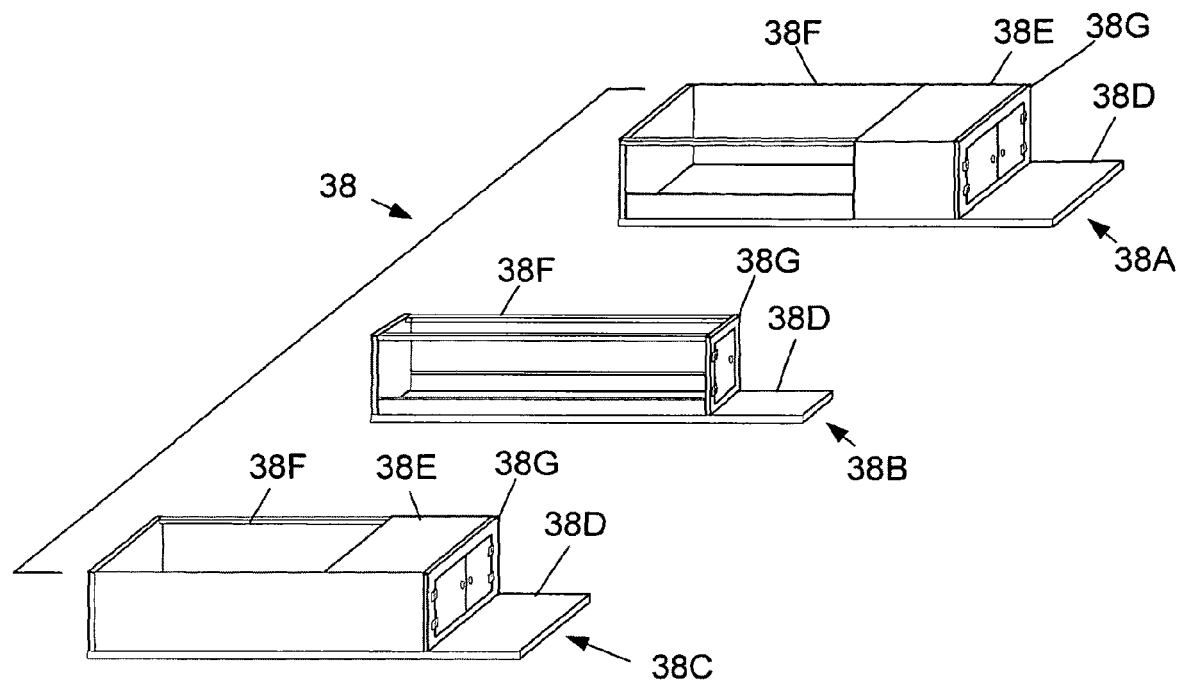
FIG. 30 is a view showing a set of three cabinet modules, each consisting of storage bins, cabinets and counters.
Figure 31:
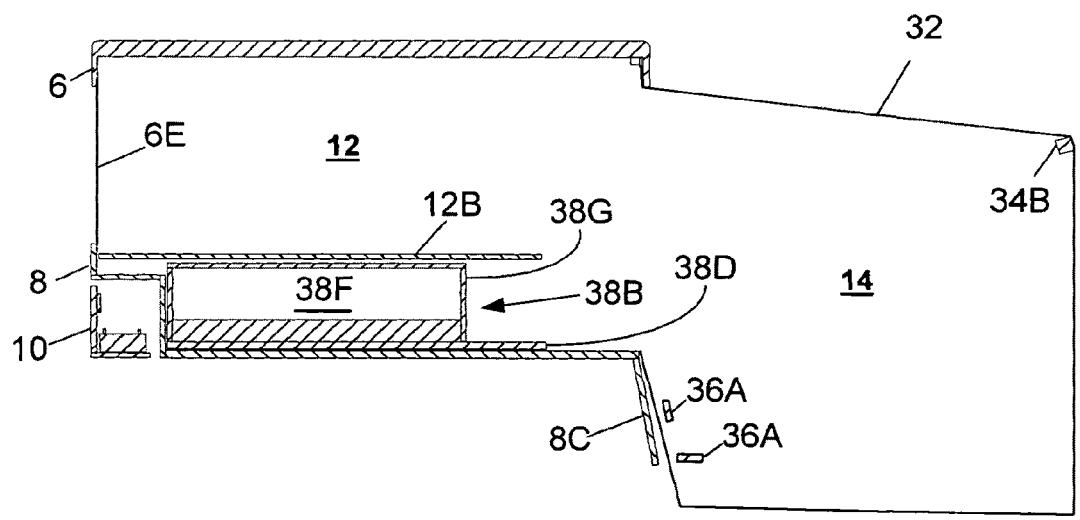
FIG. 31 is a sectional view (defined in FIG. 4) illustrating the center cabinet module, in the stowed position, under the sleeping platform, inside the camper's base module.
Figure 32:
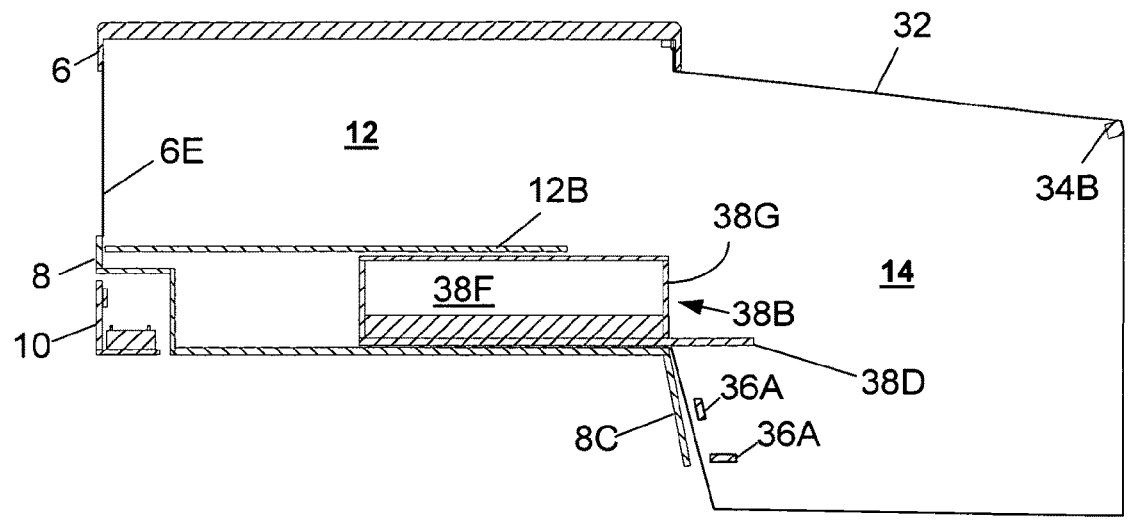
FIG. 32 is a sectional view (defined in FIG. 4) illustrating the center cabinet module with access to the counter and cabinet door.
Figure 33:
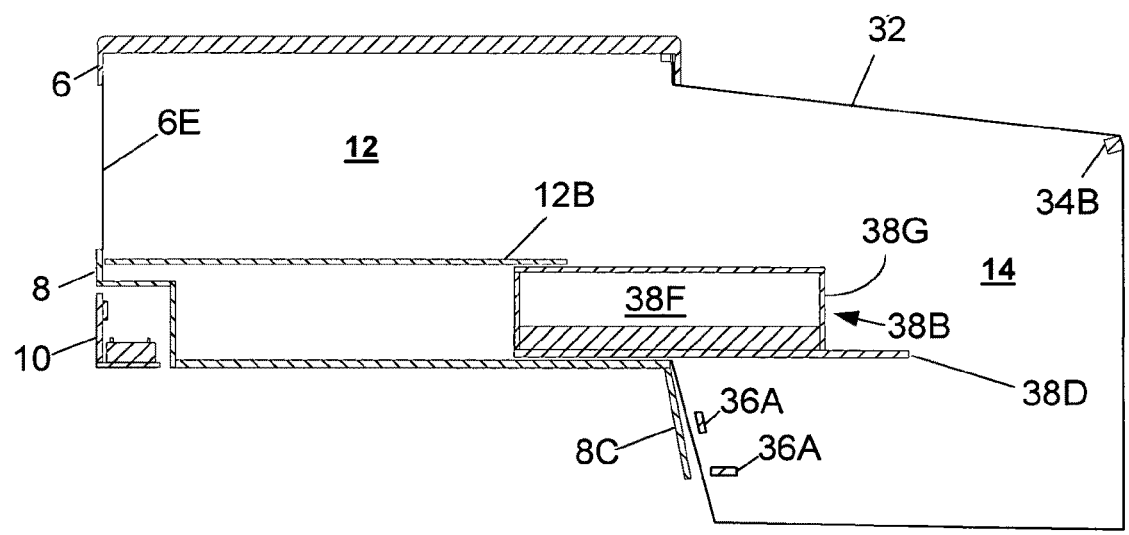
FIG. 33 is a sectional view (defined in FIG. 4) illustrating the center cabinet module, in position to access the storage bin.
Figure 34:
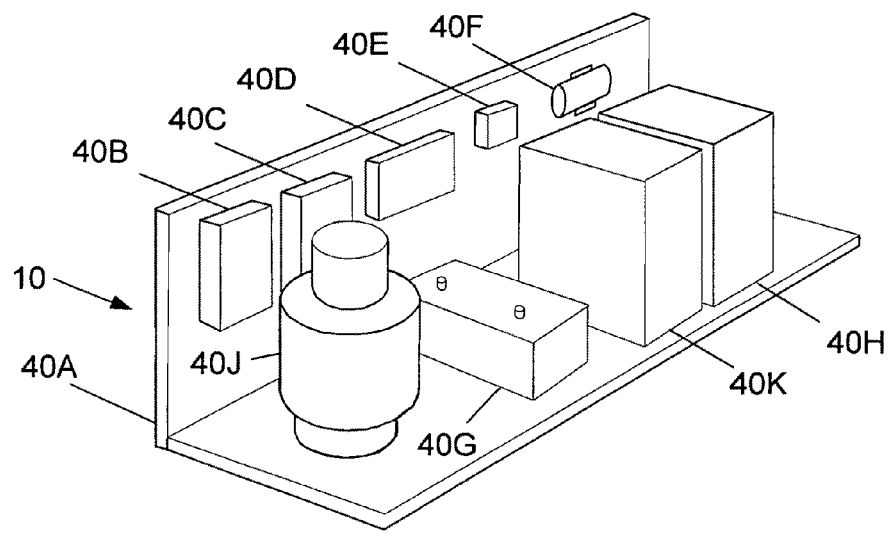
FIG. 34 illustrates the utility module combining heavy utility items into one module.

To store the attached folding stairs 36:
  A Raise the steps 36A, (FIG. 28) until the stringers 36E are parallel to the floor of the base module 8, and
  B With the stairs stringer 36E horizontal, push the sliding horizontal supports 36C in until the steps 36A (FIG. 29) will allow closing of the camper tailgate 8C.
FIG. 28—Attached Folding Stairs, Manufacturing
  Refer to "FIGS. 1,2,3,4—Camper, Manufacturing."
FIG. 28—Attached Folding Stairs and Conclusions
  Refer to "FIGS. 1,2,3,4—Camper, Variations and Conclusions."
FIG. 29—Storage Space Allocation, Overview
  The tonneau pop-up camper 2 is a fully functional camper requiring a lot of items to be stored within a limited space. FIG. 29 illustrates most of the items and their assigned storage spaces.
FIG. 29—Storage Space Allocation Preferred Embodiment
  FIG. 29, sectional drawing, is defined in FIG. 3. The roof shell 6A, utility module 10 and base chassis 8A effectively form a box that all items, camper and camping, must fit into.
  The utility module 10 (FIG. 34) is the mounting place for heavy camping items such as the deep discharge battery 40G, water tank(s) 40K,40H propane tank(s) 40J, inverter(s) 40C, etc.
  The space between the spring loaded hinged frame 6B and the sleeping platform 12B is used for the air mattress, bedding and a folding table such as a card table.
  Center cabinet module 38B is illustrated for the cabinet set 38 (FIG. 30) located under the sleeping platform 12B. Folding camp chairs 46A are stored on the cabinet counters 38D (FIG. 30). Ice chest 46B, and a portable toilet (not shown) etc. can be stored between the folding chairs 46A and camper base tailgate 8C on top of the attached folding stairs 36. The living quarters enclosure 32 is folded on top of the ice chest 46B and across the width of the camper. Miscellaneous camping items such as blankets, clothes, extra food, etc. can be stored in the storage bins 38F. Refer to FIGS. 30,31,32,33 for storage details of the cabinet set 38.
  Some additional light items such as bicycles, skis, etc. could be transported on optional roof racks 48; however, a few words of caution.
  A Some items may block the visibility thru the truck's internal rear view mirror reducing safety.
  B All items including the optional roof racks 48 will compromise the airflow, reducing gas mileage.
  C The springs in the spring loaded hinged frame 6B are sized to assist in the raising of the weight of the roof shell 6A. Typically the items on the roof shell rack mounts 48 would have to be removed before raising the roof shell 6A, since the person raising the roof shell will have to supply all the force required to raise the weight of the additional item(s).
FIG. 29—Storage Space Allocation, Operations
  Reconfiguring the camper 2 between travel and camping configurations typically requires less than two or three minutes; however, this time does not include packing and unpacking stored items, and removing or adding items from or to the roof shell racks 48.
FIG. 29—Storage Space Allocation, Manufacturing
  Refer to "FIGS. 1,2,3,4—Camper, Manufacturing."
FIG. 29—Storage Space Allocation, Variations and Conclusions
  Refer to "FIGS. 1,2,3,4—Camper, Variations and Conclusions."
FIGS. 30,31,32,33—Cabinet Set, Overview
  FIGS. 30,31,32,33 describes the cabinet set 38 (FIG. 30) located under the sleeping platform 12B (FIG. 31). The number and types of cabinet modules can be customized per specific camper requirements; however, to illustrate the concept, a set of three cabinets is shown in FIG. 30. Normal access is by extending one or more of the cabinet modules forward into the living quarters 14 as described in FIGS. 31,32,33; however, access to the storage bins 38F is also possible by raising or sliding the sleeping platform 12B forward.
FIG. 30—Cabinet Set, Preferred Embodiment
  FIG. 30 illustrates three possible types of cabinet modules:
    A. The right cabinet module 38A consists of a work counter 38D, a cabinet 38E with a door 38G, and a storage bin 38F in the back. The top and part of the left side of the storage bin 38F are open to allow access.
    B. The center cabinet module 38B consists of a work counter 38D, a cabinet door 38G, and a long thin storage bin 38F. Part of the long storage bin 38F behind the door 38G could be a cabinet, or an optional propane furnace, or it could be used as shown for storage of long items such as fishing poles etc. The top, and part of the left and right sides are left partially open to allow access to the storage bin.
    C. The left cabinet module 38C consists of a work counter 38D in the front, a cabinet 38E with a door 38G, and a storage bin 38F in the back. The top and part of the right side of the storage bin 38F are open to allow access.
FIGS. 31,32,33—Cabinet Set, Operations
  FIGS. 31,32,33, sectional drawings defined in FIG. 4, use the center cabinet module 38B to illustrate how combinations of the cabinet modules could be positioned for storage or access to their various compartments.
  FIG. 31 illustrates the stowed location of the center cabinet module 38B, under the sleeping platform 12B.
  FIG. 32 illustrates the location of the center cabinet module 38B, partially extended out from under the sleeping platform 12B, making the counter 38D and cabinet door 38G available for cooking or a work area. The storage bin 38F can be accessed via the cabinet door 38G, or through the open top of the center cabinet module 38B.
  FIG. 33 illustrates the location of the center cabinet module 38B, to access the storage bin 38F. To access the very back of the storage bin 38F, it may be necessary to return one or both side cabinet modules 38A,38C to their stowed location under the sleeping platform 12B.
FIGS. 30,31,32,33—Cabinet Set, Manufacturing
  Refer to "FIGS. 1,2,3,4—Camper, Manufacturing."
FIGS. 30,31,32,33—Cabinet Set, Variations and Conclusions
  Refer to "FIGS. 1,2,3,4—Camper, Variations and Conclusions."
FIGS. 34,35,36—Utility System, Overview
FIGS. 34,35,36 illustrate the components of the utilities system consisting of a utility module 10 (FIG. 34), an electric control module 42, (FIG. 35) and a water control module 44 (FIG. 36). The advantages of modular construction are:
  A. Maximizing truck stability, drivability, and safety by co-locating heavy items such as deep discharge battery(s), water tank(s), and propane bottle(s), etc. on a utility chassis 40A, and locating the resulting utility module 10 in the front and bottom center of the pickup truck bed.
  B. Easier loading or unloading of the camper 2 since the heavy utility module 10 is separate and will be loaded first and unloaded last.
  C. Mounting the electric control module 42 (FIG. 23) inside the camper base chassis 8A enables monitoring and control of the electrical system from inside the camper, regardless of the weather or time of day.

D. Mounting the water control module 44 on the outside of the camper base module 8A (FIG. 23) enables filling the fresh water tank 40K and emptying the gray water tank 40H even if the camper is in the travel configuration (FIG. 1).

E. A more efficient manufacturing operation, since modular assembly and testing of each type of module can be completed independent of the other camper manufacturing tasks.

FIG. 34—Utility Module, Preferred Embodiment

FIG. 34 illustrates a typical utility module 10 consisting of a utility chassis 40A, and mounted on the floor of the utility chassis 40A are: a propane tank 40J, a deep discharge battery 40G, a fresh water tank 40K a gray-water tank 40H, and additional optional items not shown. Mounted on the back of the utility chassis 40A are an electrical controller 40B, an inverter 40C, a battery charger 40D, a solenoid switch 40E, water pump 40F, and other items depending on desired camper options.

The electrical controller 40B, located on the utility module 10, functions per the following rules and definitions:

Definition: 110 VAC=110 Volts Alternating Current
Definition: 12 VDC=12 Volts Direct Current
Definition: GFI=Ground Fault Interrupt
Rule 1: If the external 110 VAC power is available, the external 110 VAC will power all electrical items within the camper.
Rule 2: If the external 110 VAC power is not available and the truck's battery is greater than 13.5 VDC, the truck's battery will power all electrical items within the camper.
Rule 3: If the external 110 VAC power is not available, and the truck's battery is less than 13.5 VDC, and the deep discharge battery 40G is greater than 11.5 volts, the deep discharge battery 40G will power all electrical items within the camper.
Rule 4: If the external 110 VAC power is not available, and the truck's battery is less than 13.5 VDC, and the deep discharge battery 40G is less than 11.5 volts, all electrical items in the camper will shut down.

FIG. 34—Utility Module, Operation

The operator controls the electrical and water functions of the utility module 10 via the electric control module 42 and water control module 44.

If access to the utility module 10 is required after the utility module 10 and camper 2 are mounted on the truck, the utility module 10 can be accessed via the utility access panel 8B (FIG. 29) in the base chassis 8A. The camper 2 must be in the camping configuration, and the sleeping platform 12B must be moved a couple of feet towards the rear of the camper 2 to expose the utility access panel 8B. Also, since the utility module 10 is separate from the campers base module 8, the base module 8 can be moved a couple of feet to the rear providing access to the utility module 10.

FIG. 35—Utility, Electric Control Module, Preferred Embodiment

FIG. 35 illustrates the electric control module 42. The electrical control panel panel 42A includes a voltmeter and switch for checking the voltage levels of the truck battery and deep discharge battery, a 110 VAC circuit breaker for overcurrent protection that can also be used as an on and off switch, and a 110 VAC GFI receptacle available for connecting items such as televisions, electric skillets, etc. to the campground's 110 VAC power source.

The 110 VAC from the campground power is connected to the electric interface box 42B by the campground voltage cable 42C. The 12 VDC from the truck's battery is connected to the electric interface box 42B by the truck voltage cable 42D. Both voltages can be monitored by the meter on the electrical control panel 42A and then passed through the interface cable 42E to the utility module 10. The interface cable 42E also returns the voltage of the deep discharge battery 40G to be monitored on the meter.

As shown in FIG. 23 the electric control module 42 is located on the passenger's side of the rear base chassis 8A wall, This location allows monitoring of the electrical system from inside the living quarters 14. The backside (not shown) of the electric control module 42 has the receptacle to receive external 110 VAC from the campground's power post.

FIG. 35—Utility, Electric Control Module, Operation

The electric control module 42 is mainly used for monitoring the campground voltage, truck's battery, and deep discharge battery 40G. The campground's 110 VAC can also be turned on or off via the 110 VAC GFI circuit breaker.

FIG. 36—Utility, Water Control Module, Preferred Embodiment

FIG. 36 illustrates the water control module 44, water interface box 44B and the water control panel 44A with two sets of control valves 44D,44G,44K,44N. FIG. 23A illustrates the location of the water control module 44 on the back driver's side of the base chassis 8A. In FIG. 36 the water control panel 44A is not visible because it is located on the outside of the camper for access when the camper is in the travel configuration.

The fresh water in hose 44C is connected to the fresh water control valve 44D connected to the fresh water tank hose 44E. The fresh water vent hose 44F is connected to the fresh water vent valve 44G connected to the fresh water vent tank hose 44H.

The gray water out hose 44J is connected to the gray water control valve 44K connected to the gray water tank hose 44L.

The gray water vent hose 44M is connected to the gray water vent valve 44N connected to the gray water vent tank hose 44P.

FIG. 36—Utility, Water Control Module, Operation

In the camping configuration, the fresh water control valve 44D will be opened as required to refill the fresh water tank 40K, and the fresh water vent valve 44G for the fresh water tank 40K should always be open, except if the camper is connected to a pressurized water source.

In the camping configuration, the gray water control valve 44K will be closed except when the gray water tank 40H is being emptied. The gray water vent valve 44N, for the gray water tank 40H, should always be open.

In the travel configuration all four valves, the fresh water control valve 44D, fresh water vent valve 44G, gray water control valve 44K, and gray water vent valve 44N are closed, except when fresh water is being added, or gray water is being drained.

FIGS. 34,35,36—Utility System, Manufacturing
Refer to "FIGS. 1,2,3,4—Camper, Manufacturing."

FIGS. 34,35,36—Utility System, Variations and Conclusions
Refer to "FIGS. 1,2,3,4—Camper, Variations and Conclusions."

I claim:

1. A tonneau style pop-up camper 2 for pickup trucks 4, comprising:
    (a) a top module 6 comprising:
        (i) a movable roof shell 6A, attached to,
        (ii) a set of spring loaded hinged frames 6B, attached to,
        (iii) a base frame 6C, and
        (iv) a sleeping quarters 12, defined as space bounded by said roof shell 6A, and said spring loaded hinged frames 6B, and, said base frame 6C, whereby when camping said top module 6 is open, and when traveling said top module 6 is closed, and (b) a base module 8 comprising:
  (i) a base chassis 8A, and
  (ii) a sleeping platform 12B attached to and located in the top portion of said base chassis 8A, and
  (iii) a cabinet set 38, located in said base chassis 8A, under said sleeping platform 12B, and
  (iv) a folding stairs 36, attached to rear of said base module 8, and
  (v) a utilities access panel 8B, located under the front of said sleeping platform 12B, and
  (vi) a living quarters 14, defined as space enclosed in a tent like structure located at ground level, and attached to the back of said base module 8, and said top module 6,
    whereby when camping said living quarters 14 are located at ground level, and when traveling said living quarters 14 are still attached to said base module 8 and said top module 6 but are folded and stored in said base chassis 8A, and (c) a distributed utilities system comprising:
  (i) an utility module 10, located under the front of said base module 8, and
  (ii) an electric control module 42, providing monitoring and control of electrical functions mounted in the back of said base chassis 8A, and
  (iii) a water control module 44, providing control of water functions mounted in the back of said base chassis 8A.

2. The spring loaded hinged frame 6B of claim 1, further including:
(a) a spring loaded hinge 16, connected to the centers of
(b) a pair of torsion bars 20, connected to
(c) a pair of stabilizer hinges 18, at the ends of said torsion bars 20, and
(d) an upper canvas lath 22, attached to the top said torsion bar 20, and
(e) a lower canvas lath 24, attached to the bottom said torsion bar 20
whereby the pair of said spring loaded hinged frames 6B assist in raising and lowering said roof shell 6A of claim 1, and control folding of said sleeping quarters 12 of claim 1.

3. The spring loaded hinge 16 of claim 2, further including:
(a) a pair of levered hinge arms 16B, attached together with
(b) an offset center hinge 26, and
(c) a set of springs 16D anchored to the ends of said levered hinged arms 16B and attached to each other by
(d) a set of cables 16F, passing around
(e) a set of pulleys 16G, mounted in said levered hinge arms 16B, and
(f) a safety latch assembly 28,
whereby, when transitioning between closed and open states, said spring loaded hinge 16 of claim 2 supplies a vectored force, resulting from the varying angle between the lever hinged arms 16B and the varying tension in the springs 16D, and when full open said spring loaded hinge 16 of claim 2 is automatically latched open by said safety latch assembly 28.

4. The safety latch assembly 28 of claim 3, further including:
(a) a spring latch 28A attached to the upper said levered hinge arm 16B of claim 3 and spanning said offset hinge 26 of claim 3 to the lower said levered hinge arm 16B of claim 3, thereby when said spring loaded hinge 16 of claim 3 is fully opened, said spring latch 28A will automatically engage,
(b) a latch catch pin 28B, located in the lower said levered hinged arm 16B of claim 3, thereby preventing closure of said spring loaded hinge 16 of claim 3, until
(c) a latch release 28C, located in the lower said levered hinged arm 16B of claim 3, is pressed, moving said spring latch 28A, up and clear of said latch catch pin 28B, thereby if pressure is maintained against said latch release 28C, said spring loaded hinge 16 of claim 3 will simultaneously fold and close,
whereby, said safety latch assembly 28 automatically locks open said spring loaded hinge 16 of claim 3, and allows simultaneous resetting of said safety latch assembly 28 when said spring loaded hinge 16 of claim 3 is being closed.

5. The sleeping quarters 12 of claim 1, further including:
(a) a sleeping quarters enclosure 6E, constructed of foldable material with
(b) a pair of lath pockets 30B, around the top and bottom edges of said sleeping quarters enclosure 6E, thereby enabling attachment of said sleeping quarters enclosure 6E to said spring loaded hinged frames 6B of claim 1, the front of said roof shell 6A of claim 1, and the front of said base frame 6C, of claim 1, and
(c) a sleeping quarters interface 30D to be attached to the front of said living quarters 14 of claim 1, and the back of base chassis 8A of claim 1, and
(d) a cross web bracing 30J for reinforcement of the front of said sleeping quarters enclosure 6E, thereby providing additional structural strength for said sleeping quarters 12 of claim 1 during windy situations, and
(e) a stretchable band pocket 30L centered around the three sides of said sleeping quarters 12 of claim 1 holding
(f) a stretchable band 30E located in said stretchable band pocket 30L, thereby when the ends of said stretchable band 30E are connected and encircle the sides of sleeping quarters enclosure 6E and the top of said living quarters 14 of claim 1, the said stretchable band 30E holds the sides of said sleeping quarters 12 of claim 1 and the top of said living quarters 14 of claim 1 against said spring loaded hinged frames 6B of claim 1, for proper folding when said roof shell 6A of claim 1 is lowered.

6. The cabinet set 38 of claim 1 located under said sleeping platform 12B of claim 1 further including:
(a) a right cabinet module 38A, comprising of counters, cabinets and storage bins, is located under said sleeping platform 12B of claim 1, and is made accessible by pulling said right cabinet module 38A towards said living quarters 14 of claim 1, and
(b) a center cabinet module 38B, comprising of counters, cabinets and storage bins, is located under said sleeping platform 12B of claim 1, and is made accessible by pulling said center cabinet module 38B towards said living quarters 14 of claim 1, and
(c) a left cabinet module 38C, comprising of counters, cabinets and storage bins, is located under said sleeping platform 12B of claim 1, and is made accessible by pulling said left cabinet module 38C towards said living quarters 14 of claim 1.

7. The attached folding stairs 36 of claim 1, further including:
   (a) a set of steps 36A, across the full internal width of said base module 8 of claim 1, are attached to
   (b) a set of stringers 36E attached to
   (c) a set of stringer pivots 36F, attached to
   (d) a set of sliding horizontal supports 36C, attached to the sides of said base chassis 8A of claim 1, and
   (e) a set of vertical support straps 36D, holding said steps 36A at an angle,
   whereby said attached folding stairs 36 of claim 1 allow access between said living quarters 14 of claim 1 and said sleeping quarters 12 of claim 1 across the entire back of said base module 8 of claim 1; and enables said attached folding stairs 36 of claim 1 to be stored in said base module 8 of claim 1 by raising said steps 36A and sliding said steps 36A into said base module 8 of claim 1.

8. The living quarters 14 of claim 1, further including:
   (a) a living quarters enclosure 32, attached to the back of said roof shell 6A of claim 1, the sides of said sleeping quarters 12 of claim 1, the floor of said base chassis 8A of claim 1, and attached to and supported by
   (b) a frame extension 34 further including,
      (i) a frame cross member 34B attached to
      (ii) a pair of frame extension poles 34A, positioned by
   (c) a pair of frame bracket interfaces 35 further including:
      (i) a pair of guide brackets 35A attached to the sides of said base chassis 8 of claim 1 and
      (ii) a pair of storage tubes 35B attached to the pair of said guide brackets 35A and the sides of said base chassis 8 of claim 1 and
      (iii) a pair of stop blocks 35C attached to the pair of said guide brackets 35A and the sides of said base chassis 8A of claim 1,
   whereby said living quarters enclosure 32, said frame extension 34, and said frame bracket interfaces 35, are the complete pre-assembled said living quarters 14 of claim 1, when folded ready for travel, or when extended ready for camping.

9. The utility module 10 of claim 1, further including
   (a) a utility chassis 40A, and the components mounted on said utility chassis 40A includes
   (b) a battery 40G, and
   (c) a fresh water tank 40K, and
   (d) a gray water tank 40H,
   whereby, components of said utility module 10 of claim 1 are part of said distributed utilities system of claim 1, and said utility module 10 being separately located front and center under said base module 8 of claim 1, said utility module 10 can be accessed for service by sliding the base module 8 of claim 1 back from said utility module 10 of claim 1, or by removing said utility access panel 8B of claim 1.

10. The electric control module 42 of claim 1, further including:
    (a) an electric interface box 42B, mounted on the wall of said base chassis 8A of claim 1, and mounted on the front of said electric interface box 42B
    (b) an electrical control panel 42A for monitoring and control of the electric components of said utility module 10 of claim 1,
    whereby, said electric control module 42 of claim 1 enables control and monitor of the electrical items located on said utility module 10 of claim 1.

11. The water control module 44 of claim 1, further including:
    (a) a water interface box 44B, mounted on the wall of said base chassis 8A of claim 1 and mounted on the front of said water interface box 44B
    (b) a water control panel 44A for control of the water system components on said utility module 10 of claim 1,
    whereby, said water control module 44 of claim 1 enables control of the water components located on said utility module 10 of claim 1.

* * * * *